US011919013B2

(12) United States Patent
Quinn et al.

(10) Patent No.: US 11,919,013 B2
(45) Date of Patent: Mar. 5, 2024

(54) TANGENTIAL OSCILLATING MASSAGE ENGINE

(71) Applicant: WATER PIK, INC., Fort Collins, CO (US)

(72) Inventors: Michael J. Quinn, Windsor, CO (US); Preston Peterson, Loveland, CO (US)

(73) Assignee: WATER PIK, INC., Fort Collins, CO (US)

( * ) Notice: Subject to any disclaimer, the term of this patent is extended or adjusted under 35 U.S.C. 154(b) by 612 days.

(21) Appl. No.: 17/253,528

(22) PCT Filed: Jul. 12, 2019

(86) PCT No.: PCT/US2019/041624
§ 371 (c)(1),
(2) Date: Dec. 17, 2020

(87) PCT Pub. No.: WO2020/014624
PCT Pub. Date: Jan. 16, 2020

(65) Prior Publication Data

US 2021/0129162 A1 May 6, 2021

Related U.S. Application Data

(60) Provisional application No. 62/696,944, filed on Jul. 12, 2018.

(51) Int. Cl.

| | |
|---|---|
| ***B05B 1/34*** | (2006.01) |
| ***B05B 1/08*** | (2006.01) |
| ***B05B 1/16*** | (2006.01) |
| ***B05B 1/18*** | (2006.01) |

(52) U.S. Cl.
CPC .................. *B05B 1/34* (2013.01); *B05B 1/08* (2013.01); *B05B 1/1663* (2013.01); *B05B 1/18* (2013.01)

(58) Field of Classification Search
CPC ......... B05B 1/08; B05B 1/083; B05B 1/1636; B05B 1/1663; B05B 1/169; B05B 1/18; B05B 1/34; B05B 1/3405; B05B 1/341; B05B 1/3421; B05B 1/3426; B05B 3/04
See application file for complete search history.

(56) References Cited

U.S. PATENT DOCUMENTS 4,204,646 A * 5/1980 Shames ................. B05B 1/1609 239/443
4,303,201 A * 12/1981 Elkins ........................ B05B 3/04 4/596
5,397,064 A 3/1995 Heitzman
6,230,989 B1 5/2001 Haverstraw et al.
2001/0023901 A1 9/2001 Haverstraw et al.
(Continued)

FOREIGN PATENT DOCUMENTS

CN 1333706 1/2002

*Primary Examiner* — Darren W Gorman
(74) *Attorney, Agent, or Firm* — Dorsey & Whitney LLP

(57) ABSTRACT

The present disclosure relates to a showerhead that outputs a pulsating or massaging spray. The showerhead may include an engine including a flow directing housing, a turbine, and a shutter to create the pulsating or intermittent spray. The flow directing housing may have a plurality of flow directing apertures defined around its perimeter, allowing for water to tangentially flow into the engine, rotating the turbine. As the turbine rotates, the shutter moves back and forth creating the pulsating spray.

19 Claims, 21 Drawing Sheets

(56) References Cited

U.S. PATENT DOCUMENTS

| | | | | |
|---|---|---|---|---|
| 2007/0205309 | A1* | 9/2007 | Zhou | B05B 3/0427 239/587.5 |
| 2010/0127096 | A1 | 5/2010 | Leber | |
| 2011/0114754 | A1* | 5/2011 | Li | B05B 1/18 239/222.11 |
| 2013/0199641 | A1 | 8/2013 | Zhou et al. | |
| 2014/0008462 | A1* | 1/2014 | Gransow | B05B 1/14 239/391 |
| 2014/0367482 | A1 | 12/2014 | Cacka et al. | |
| 2016/0296950 | A1* | 10/2016 | Tian | B05B 1/083 |
| 2017/0297039 | A1 | 10/2017 | Cacka et al. | |
| 2019/0039079 | A1* | 2/2019 | Lin | B05B 12/04 |

* cited by examiner

TANGENTIAL OSCILLATING MASSAGE ENGINE

CROSS REFERENCE TO RELATED APPLICATIONS

This application is a national stage application under 35 U.S.C. § 371 of International Application No. PCT/US2019/041624, filed Jul. 12, 2019, entitled "Tangential Oscillating Massage Engine," which claims the benefit of priority pursuant to 35 U.S.C. § 119(e) of U.S. provisional application No. 62/696,944 filed Jul. 12, 2018 and entitled "Tangential Oscillating Massage Engine," both of which are hereby incorporated herein by reference in their entirety.

TECHNICAL FIELD

The technology described herein relates generally to showerheads, and more specifically to pulsating showerheads.

BACKGROUND

Showers are an alternative to bathing in a bathtub. Generally, showerheads are used to direct water from the home water supply onto a user for personal hygiene purposes.

In the past, bathing was the overwhelmingly popular choice for personal cleansing. However, in recent years showers have become increasingly popular for several reasons. First, showers generally take less time than baths. Second, showers generally use significantly less water than baths. Third, shower stalls and bathtubs with showerheads are typically easier to maintain. Over time, showers tend to cause less soap scum build-up.

With the increase in popularity of showers has come an increase in showerhead designs and showerhead manufacturers. For example, some showerheads are referred to as "drenching" showerheads, since they have relatively large faceplates and emit water in a steady, soft spray pattern. Other showerheads may emit pulsating streams of water in a so-called "massage" mode.

Pulsating showerheads generally house an "engine" (i.e., a mechanical component) inside the showerhead that converts constant water flow into a pulsating stream of water to be dispensed. Such engines are often large and cumbersome. Because the showerhead housing must accommodate this engine, many pulsating showerheads have a thick showerhead form factor.

The information included in this Background section of the specification, including any references cited herein and any description or discussion thereof, is included for technical reference purposes only and is not to be regarded subject matter by which the scope of the invention as defined in the claims is to be bound.

SUMMARY

The present disclosure relates to a showerhead that outputs a pulsating or massaging spray. In some embodiments, the showerhead may include an engine including a flow directing housing, a turbine, and a shutter to create the pulsating or intermittent spray. The flow directing housing may have a plurality of flow directing apertures defined around its perimeter, allowing for water to tangentially flow into the engine, rotating the turbine. As the turbine rotates, the shutter moves back and forth creating the pulsating spray.

In one embodiment, a showerhead is disclosed. The showerhead may include a housing defining a chamber in fluid communication with a fluid inlet, a first bank of nozzles, and a second bank of nozzles. A pulsed spray engine may be at least partially received within the chamber. The pulsed spray engine may include a flow directing housing that includes a plurality of flow directing apertures positioned around a perimeter of the flow directing housing, wherein the plurality of flow directing apertures are in fluid communication with the fluid inlet; a turbine positioned within the flow directing housing, wherein the turbine includes a plurality of blades; a cam coupled to the turbine; and a shutter coupled to the cam. As the turbine rotates, the cam causes the shutter to alternatingly connect and disconnect the first bank of nozzles and the second bank of nozzles from the fluid inlet.

In another embodiment, a method of producing a pulsating spray mode for a showerhead is disclosed. The method includes fluidly connecting a pulsed spray engine to a fluid source, wherein the pulsed spray engine includes a housing with a plurality of apertures, wherein the plurality of apertures provide tangential streams of fluid into the housing; fluidly connecting a first plurality of nozzles to the fluid source, wherein the pulsed spray engine opens each of the nozzles within the first plurality of nozzles substantially simultaneously; and fluidly disconnecting the first plurality of nozzles from the fluid source, wherein the pulsed spray engine closes each of the nozzles within the first plurality of nozzles substantially simultaneously.

In yet another embodiment, a method of assembling a showerhead is disclosed. The method includes connecting a pulsed spray engine to a front plate defining a plurality of outlets, wherein the pulsed spray engine includes a plurality of apertures around a perimeter of the pulsed spray engine and the plurality of apertures create a tangential feed of a fluid into the pulsed spray engine; connecting an engine housing to the front plate to form an engine enclosure; placing the engine enclosure within a spray head a number of degrees out of alignment from an operational orientation; rotating the engine enclosure the number of degrees into the operational orientation; and connecting the engine enclosure to the spray head by a fastener received through a back wall of the spray head.

In other embodiments, a showerhead engine is disclosed. The showerhead engine includes a housing with a tangential fluid feed; a turbine positioned within the housing; a shutter operatively coupled to the turbine; and a cam positioned within an aperture of the shutter and eccentrically oriented relative to a center of the turbine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

DETAILED DESCRIPTION

Figure 1A:
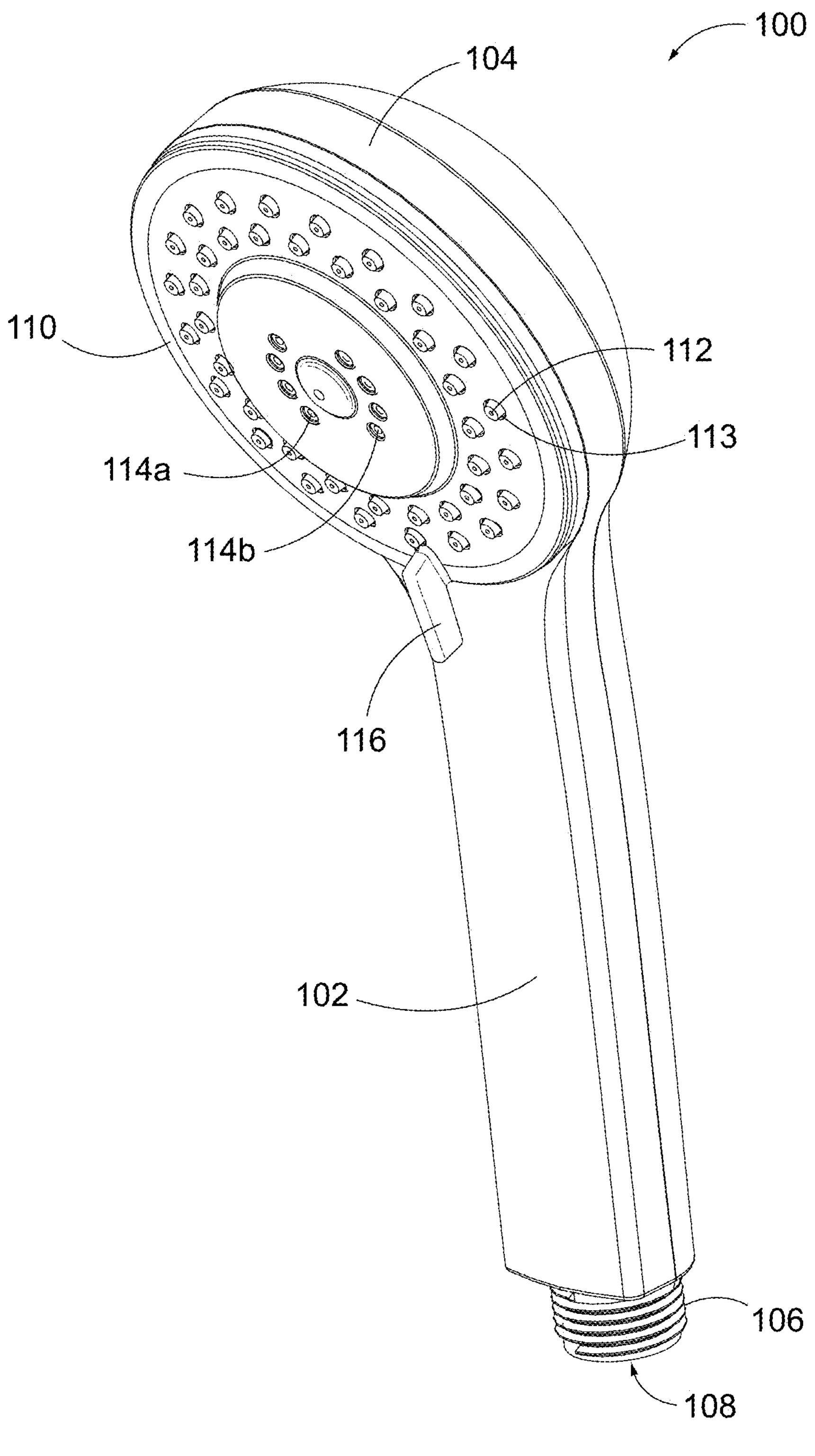
FIG. 1A is a front right isometric view of a showerhead including a massage mode selector.

This disclosure is related to a showerhead that outputs a pulsating or massaging spray. The showerhead may include an "engine" (i.e., a mechanical component) including a flow directing housing, a turbine, and a shutter to create the pulsating or intermittent spray. In one embodiment, the turbine defines one or more cams or cam surfaces, and the shutter, which may be restrained in certain directions, follows the movement of the cam to create the pulsating effect by selectively blocking and unblocking outlet nozzles.

In operation, water flowing through the showerhead causes the turbine to spin and, as the turbine spins, the cam rotates causing the shutter to oscillate. In examples where the shutter movement is constrained in one or more directions, the shutter may move in a reciprocal motion, such as a back and forth motion, rather than a continuous rotational motion. The reciprocal motion allows a first group of nozzles to be covered by the shutter, while a second group of nozzle is uncovered and, as the shutter reciprocates, the shutter moves to close the second group of nozzles at the same time that the first group of nozzles is opened. In many embodiments the nozzles in both groups may not be open or "on" at the same time. In particular, nozzles from a first nozzle group may be closed while nozzles from the second group are open and vice versa.

In several embodiments, water flows tangentially into the engine to spin the turbine. In one embodiment, the outer wall of the engine has flow directing apertures that allow water flowing through the showerhead to enter the engine and power the turbine. The tangential feed through the apertures in the engine's outer wall allows for a more compact and smaller sized engine than conventional showerhead engines. As used herein, the term "tangential" is meant to include "substantially tangential" or "quasi-tangential." In other words, the water flow may enter from the side of the engine at an angle of 90 degrees or at an angle that is slightly greater than 90 degrees to the radius of the engine in order to strike the turbine.

Some embodiments of showerheads of the present disclosure may also include different water dispensing modes. Such showerheads may include a face plate, a nozzle membrane, a mode selector, an engine housing with one or more mode apertures on its rear surface, and a mode seal located behind the engine housing within a spray head. The mode selector may be attached to the face plate, allowing a user to turn the plate and select different modes. The face plate may be attached to the engine housing such that a rotation of the face plate also turns the engine housing. The positioning of the engine housing relative to the mode seal may determine the water dispensing mode. Because each mode aperture may correspond to a particular fluid channel and nozzle group of the showerhead, the water dispensing mode depends on which mode apertures are opened or closed based on their position relative to the mode seal. For example, a particular mode aperture may be open that allows water to flow to a set of nozzles that allow for constant water flow. As another example, a mode aperture may be open that allows water to flow to a set of nozzles that allow for a pulsating water flow. In yet another example, more than one mode aperture may be open allowing for water to flow to numerous sets of nozzles that allow for both a constant water flow and a pulsating water flow.

In some embodiments, the various components of the showerhead may be configured to be assembled and disassembled quickly and repeatedly. For example, the showerhead may include a handle having a spray head, a face plate with a nozzle membrane, an engine, and an engine housing. The engine may include the various internal components of the showerhead such as the turbine, one or more cams, the shutter, and the flow directing housing. The engine is received in an engine enclosure between the engine housing and the face plate with nozzle membrane. The engine is attached to the face plate with nozzle membrane and the face plate and nozzle membrane are secured to the engine housing to form the engine enclosure which is then received within the spray head. The engine enclosure may be configured to engage one or more keying elements in the spray head or other component such as a mounting plate connected thereto. A fastener or other component may be used to secure the engine enclosure to the spray head once the engine enclosure is rotated to a desired, functional position. The fastener may be easily accessible from the exterior of the showerhead to allow the fastener to be removed without damaging the housing. Once the fastener is removed the engine enclosure can be rotated out of alignment with the keying features and removed easily without damaging the other components.

In one example, the fastener may include a snap-fit connection between a back plate of the engine housing and a mounting plate connected to the spray chamber housing or the spray chamber housing itself. In this example, the engine may be snapped into place within the spray head. In another example, the fastener may be a screw or other threaded element that is threaded to a keyed washer. The keyed washer may be connected to the engine enclosure through a cap cavity in a back wall of the spray head or other housing. In this example, the showerhead may include a decorative cap that may conceal the fastener when the showerhead is assembled.

In embodiments where the engine enclosure may be selectively attached and detached from the spray head, the showerhead may be manufactured at a lower cost with increased reliability. In particular, often the handle and/or cover may be plated with an aesthetically pleasing material, such as a chrome or metal plating. These may be the most expensive components of the showerhead as the remaining components may be constructed out of plastic and other relatively inexpensive materials. In conventional shower-heads, once the showerhead had been assembled, the engine could not be removed without damaging components of the showerhead. As such, if one or more components within the engine were damaged or flawed, the entire showerhead was often tossed out. However, in embodiments having the removable engine, the showerheads can be assembled, tested, and, if a component is not operating as desired, the engine can be removed and replaced without disposing of the more expensive components as well.

Turning to the figures, showerhead embodiments of the present disclosure will now be discussed in more detail. FIGS. 1A-3 are various views of a showerhead 100. In the depicted embodiment, the showerhead 100 may include a handle 102, a spray chamber housing 202, a spray head 104, an engine enclosure 200, and mode varying components. The engine enclosure 200 may include a pulsed spray engine 142, an engine housing 120, a nozzle membrane 118, and a nozzle face plate 110. The pulsed spray engine 142 may include a flow directing housing 144, a turbine 148, a cam 158, a cam follower 160, a shutter 150, and a pin 146 that links the engine components together. The mode varying components may include a plunger 130 with a spring 132, a mode seal 134, a washer 136, and a fastener 138.

In the embodiment shown in FIGS. 1A-3, the showerhead 100 is a handheld showerhead. However, in other embodi-ments, the showerhead 100 may be a fixed or wall mount showerhead, in which case the handle 102 may be omitted or reduced in size. In embodiments where the showerhead 100 is a handheld showerhead, the handle 102 may be an elongated member having a generally circular cross section or otherwise be configured to be comfortably held in a user's hand. The handle 102 defines a fluid inlet 108 for the showerhead 100 that receives water from a fluid source, such as a hose, J-pipe, or the like. The handle 102 may include a fluid inlet channel 182, which fluidly connects a fluid inlet chamber 183 within the spray head 104 to the fluid inlet 108. Depending on the water source, the handle 102 may include threading 106 or another connection mechanism that can be used to secure the handle 102 to the hose, pipe, etc. While not shown, it is also contemplated that the handle 102 may have a regulator and a filter secured at the threaded end 106 of the handle 102. These components may be positioned within the fluid inlet channel 182 of the handle 102.

Figure 1B:
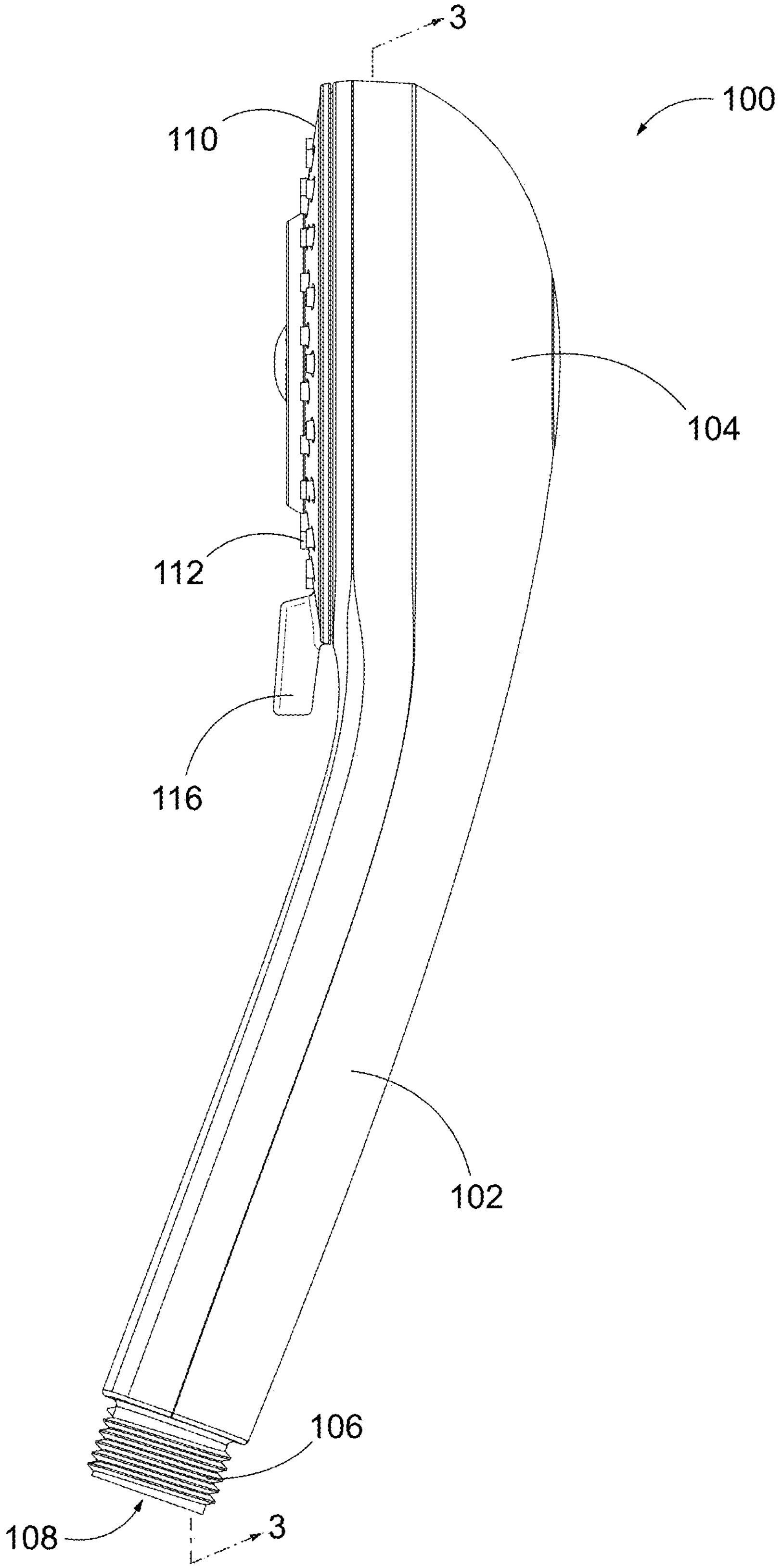
FIG. 1B is a right side elevation view of the showerhead of FIG. 1A.

The spray head 104 includes a face plate 110 that includes a plurality of nozzle openings 113 with output nozzles from nozzle membrane 118 protruding through the nozzle open-ings 113. The output nozzles are arranged in sets or arrays, e.g., a first nozzle array 112 and a second nozzle array 114*a,b*, that function as outlets for the showerhead 100. As will be discussed in more detail below, each of the selected nozzle arrays 112, 114*a,b* may be associated with a different mode for the showerhead 100. Additionally, certain nozzle arrays may be arranged in different configurations and with different groupings of nozzles. For example, as shown in FIG. 1A, the second nozzle array 114*a,b* includes two different groupings of nozzles that are both crescent shaped, include four nozzles each, and are positioned opposite one another. However, the example shown in FIGS. 1A and 1B is meant to be illustrative only and many other embodiments are envisioned.

As shown in FIGS. 2-5B, 10 and 14, the face plate 110 forms a front side of the engine enclosure 200 and may attach to the engine housing 120 to form the engine enclo-sure 200 that surrounds the pulsed spray engine 142. The engine housing 120 may have a front plate 124 and a back plate 126. The front plate 124 may receive the pulsed spray engine 142 and may attach to the face plate 110 such that the pulsed spray engine 142 and the nozzle membrane 118 are enclosed between the engine housing 120 and the face plate 110. The face plate 110 may include a mode selector 116. Moving the mode selector may turn the face plate 110, the nozzle membrane 118, the pulsed spray engine 142, and the engine housing 120. The black plate 126 of the engine housing 120 may engage with a plunger 130 and a mode seal 134. The plunger 130 may include a spring 132 that allows the plunger 130 to flexibly engage with the back plate 126.

Figure 2:
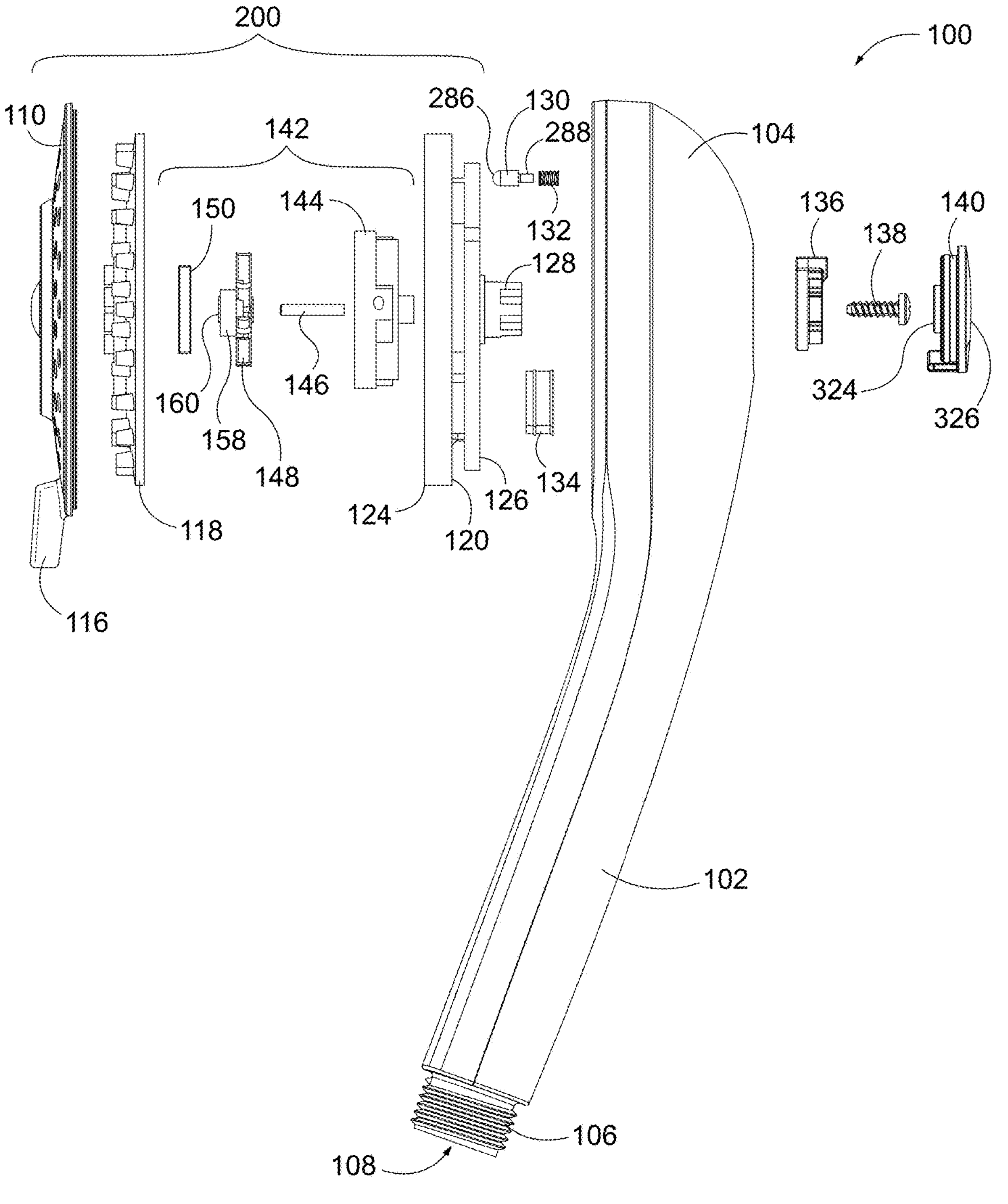
FIG. 2 is a right side elevation exploded view of the showerhead of FIG. 1A.
Figure 3:
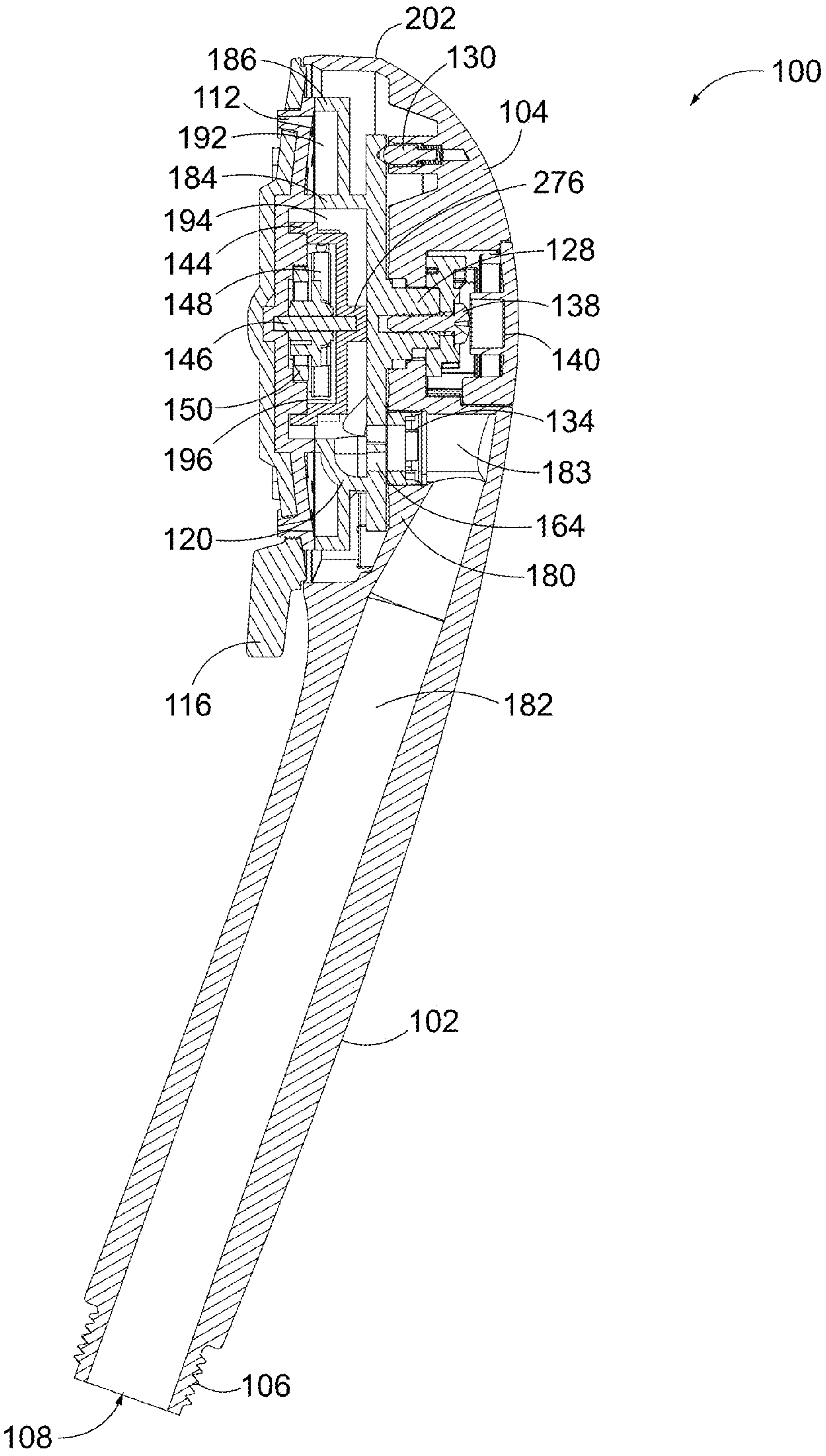
FIG. 3 is a right side cross-sectional view of the showerhead of FIG. 1A as indicated by line 3-3 in FIG. 2.

With continued reference to FIGS. 2 and 3, the back plate 126 may also include a key 128 that engages with a keyed washer 136, which seats inside the spray head 104. The key 128 and the keyed washer 136 may be configured with substantially matching shapes. The key 128 and keyed washer 136 may be connected by a fastener 138 received through a back wall of the spray head 104. The keyed washer 136 and the fastener 138 may be concealed by a cap 140 that attaches to the back wall of the spray head 104.

Figure 4:
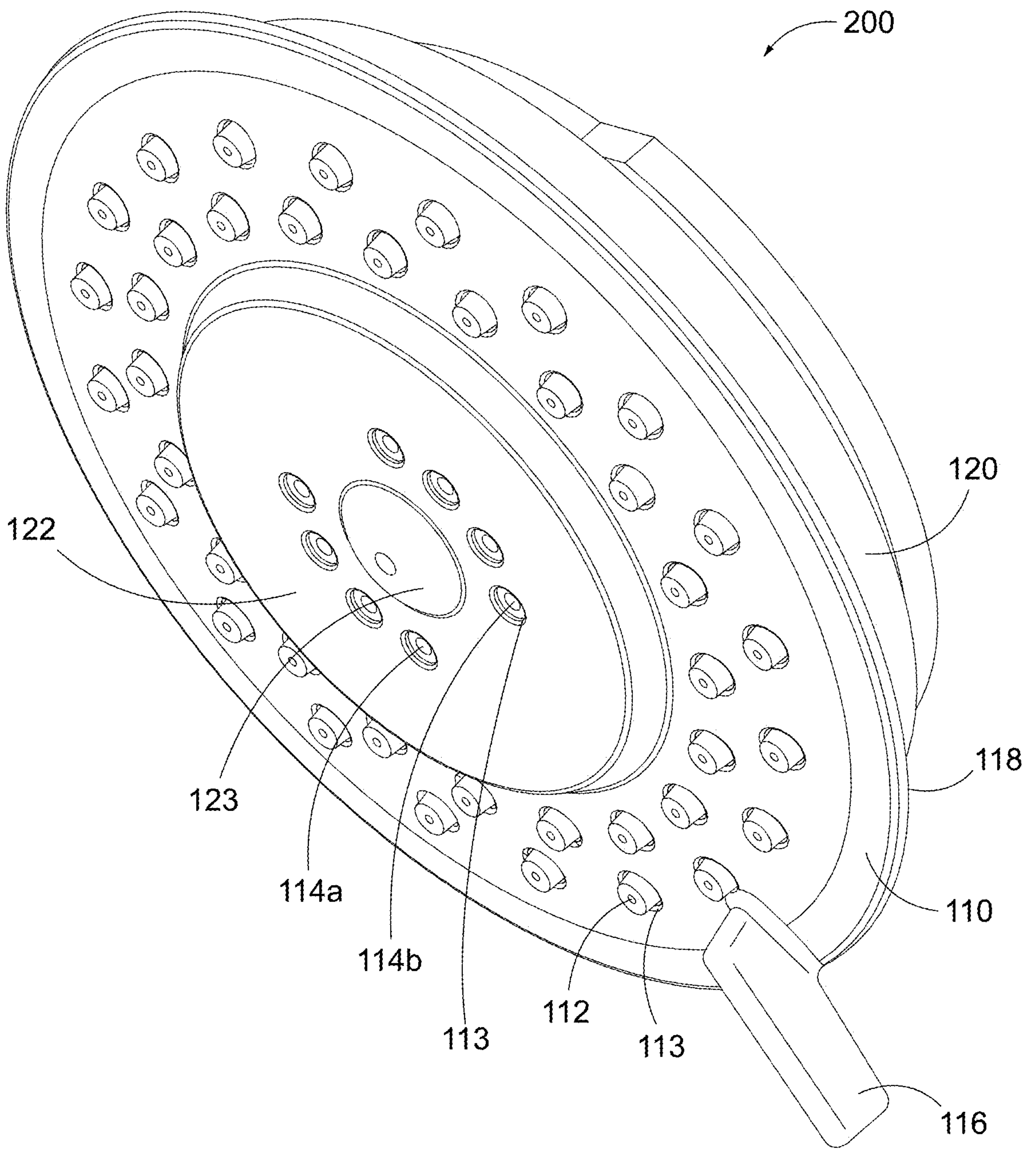
FIG. 4 is a front right isometric view of an engine enclosure of the showerhead of FIG. 1A.

The face plate 110 will now be discussed in more detail. FIG. 4 shows an isometric view of the face plate 110 attached to the engine enclosure 200. The face plate 110 may have a circular, disc-shaped structure. The face plate 110 may have a rim around an outer edge to attach to other plates and components. The face plate 110 may include a raised platform 122 extending outward from a central region of the face plate 110. The platform 122 may be a circular shape; however, other shapes are contemplated. The raised platform 122 may also include a nub 123 extending outward from the center of the platform 122. The nub 123 depicted has a circular and rounded shape.

As shown in FIG. 4, the face plate 110 defines a plurality of openings 113 for receipt of nozzle arrays 112, 114*a,b* extending from the nozzle membrane 118. Depending on the desired spray characteristics for each mode of the shower-head 100, the nozzles in the nozzle arrays 112, 114*a,b* may be raised protrusions on the nozzle membrane 118 with conduits therethrough and an outlet in the middle, apertures formed through the face plate 110, or the like, or any combination thereof. The first nozzle array 112 may be formed by a plurality of nozzles arranged in concentric rings surrounding the platform 122. The second nozzle array 114*a,b* may be positioned within openings 113 on the top surface of the platform 122. In this manner, the second nozzle array 114*a,b* may form an innermost ring of nozzles for the showerhead 100 with the first nozzle array 112 surrounding the second nozzle array 114*a,b*. In this example, the nozzles in the second nozzle array 114*a,b* are arranged into two groupings that are curved so as to form opposing parenthesis shapes facing one another with the nub 123 positioned between them. The two groupings in the second nozzle array 114*a,b* may generally match the curvature of the curved sidewalls of the platform 122. Each grouping in the second nozzle array 114*a,b* may include a plurality of nozzles. In one example, each nozzle grouping may include four nozzles; however, the number of nozzles and the positioning of the nozzles may vary based on the desired output characteristics of the showerhead 100. While only two nozzle arrays are depicted in this embodiment, other numbers of nozzle arrays are contemplated in further embodiments.

The face plate 110 may also include a mode selector 116. As shown in FIG. 4, the mode selector 116 may be positioned on a lower portion of the face plate 110 and extend outwardly from an edge of the face plate 110. The mode selector 116 may be a finger grip formed integrally with the face plate 110. The mode selector 116 may have a smooth or rough surface. The mode selector 116 may be of the same material as the face plate 110 or it may be coated with a rubber elastomer or other gripping material.

Figure 6:
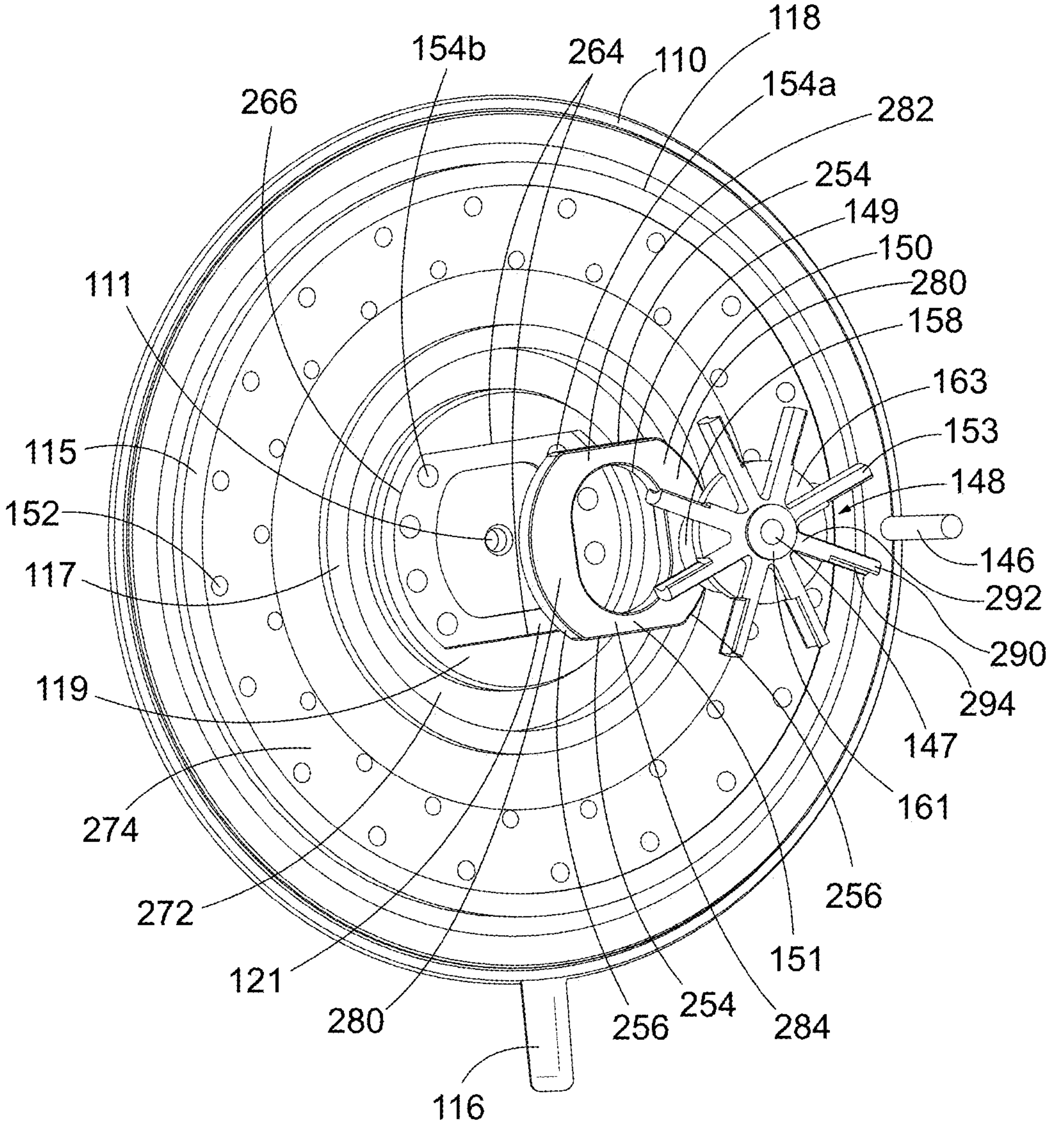
FIG. 6 is an isometric, exploded view of the face plate with nozzle membrane and engine components of the showerhead of FIG. 1A.

As shown in FIG. 6, the nozzle membrane 118 may seat on a back surface of the face plate 110. The engine components shown are the shutter 150, the cam 158, the turbine 148, and the pin 146, which couples with the nozzle membrane 118.

The back surface of the nozzle membrane 118 may have an outer membrane ring 115, an inner membrane ring 117, an inner membrane platform 119, an outer membrane recess 274, an inner membrane recess 272, a shutter recess 121, and a plurality of apertures 152 and 154*a,b*. The recessed space between the outer membrane ring 115 and the inner membrane ring 117 forms the outer membrane recess 274. The recessed space between the inner membrane ring 117 and the inner membrane platform 119 forms the inner membrane recess 272. The shutter recess 121 forms a recess within the inner membrane platform 119. The outer membrane recess 274 and the inner membrane recess 272 form concentric rings. The shape of the shutter recess 121 is defined by two parallel constraining walls 264 formed on opposite sides and two curved walls 266 formed on opposite sides.

A plurality of apertures 152 seat between the outer membrane ring 115 and the inner membrane ring 117 and are defined within the outer membrane recess 274. The plurality of apertures 152 may be arranged in one or more concentric rings surrounding the inner membrane ring 117. FIG. 6 shows two concentric rings of apertures 152; however, other arrangements are contemplated. The apertures 152 coincide with the first nozzle array 112 and form the openings into the conduits of the nozzles. Another plurality of apertures 154*a,b* are defined within the shutter recess 121. A pin-receiving recess 111 is formed in the center of the shutter recess 121. The plurality of apertures 154*a,b* are positioned in two curved arrangements so as to form opposing parentheses shapes facing one another with the pin-receiving recess 111 positioned between the two curved arrangements. The arrangement of the apertures 154*a,b* generally matches the curvature of the curved sidewalls 266 of the shutter recess 121. The apertures 154*a,b* coincide with the second nozzle array 114*a,b* and form the openings into the conduits of the nozzles. While only eight apertures 154*a,b* are shown, other numbers of apertures are contemplated in further embodiments. The inner membrane recess 272 may have no apertures.

Figure 7A:
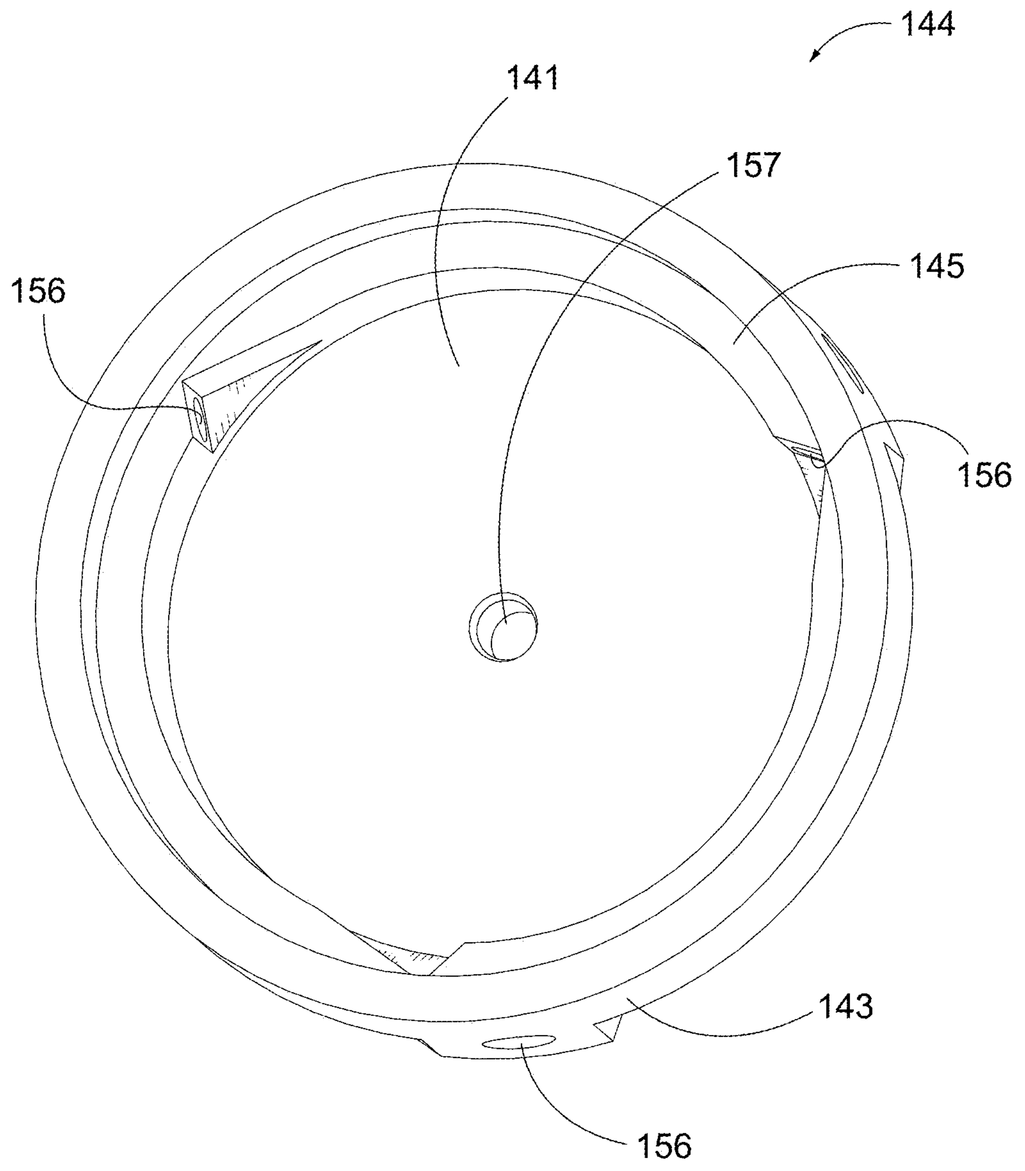
FIG. 7A is an isometric view of flow directing housing of an engine of the showerhead of FIG. 1A.
Figure 8:
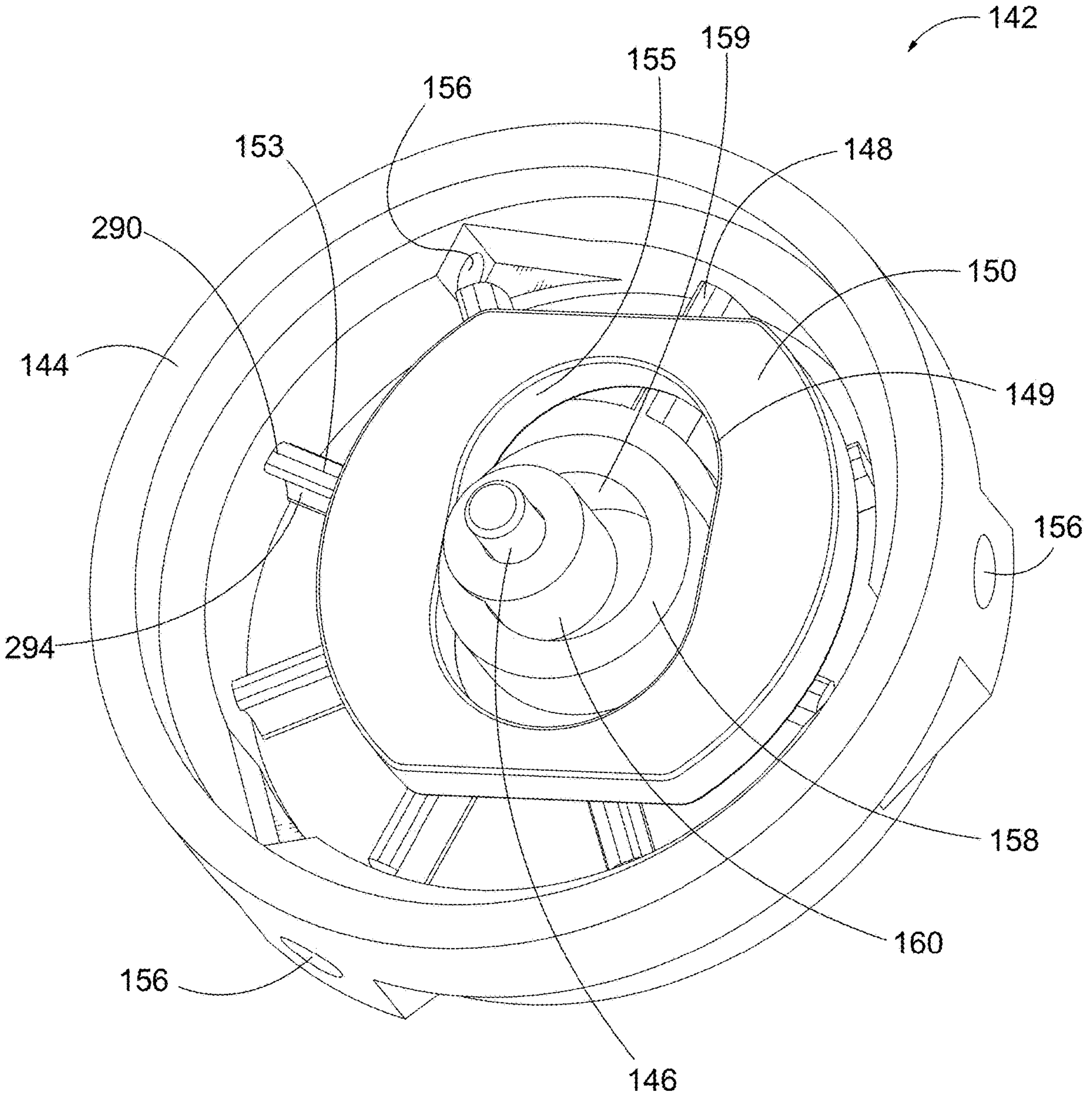
FIG. 8 is an isometric view of an engine of the showerhead of FIG. 1A.
Figure 9:
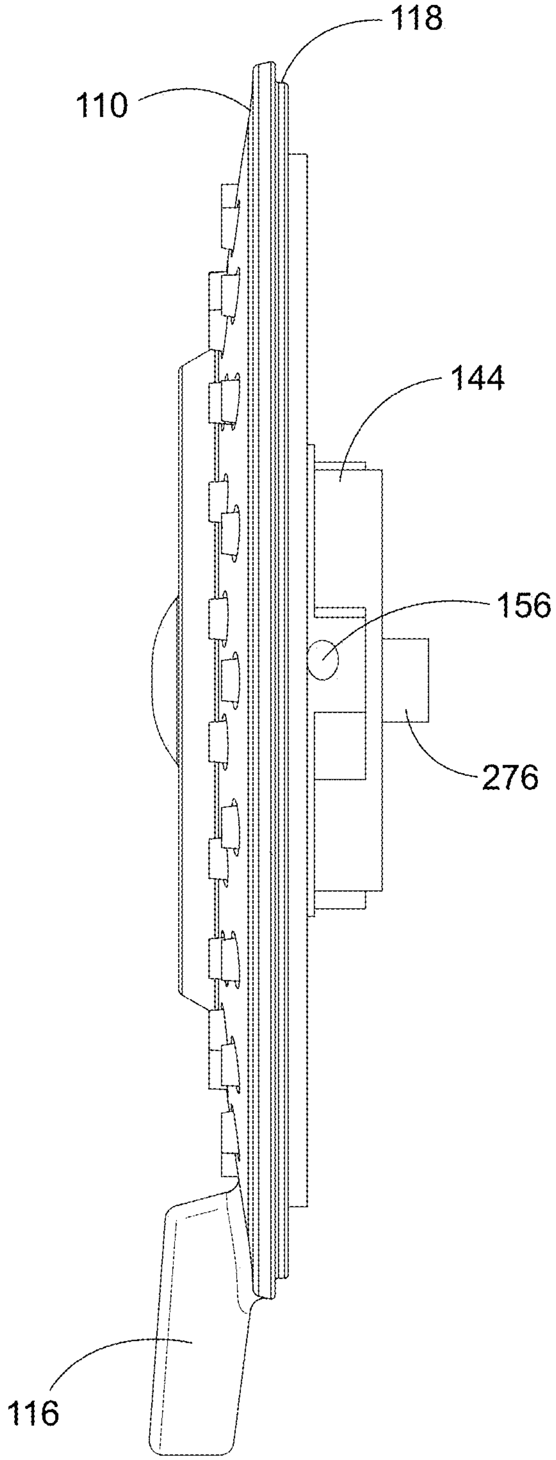
FIG. 9 is a right side elevation view of the face plate with nozzle membrane attached to the engine of FIG. 8.

With reference to FIGS. 6, 7A, and 8, the pulsed spray engine 142 will now be discussed in more detail. The engine includes the shutter 150, the turbine 148, the cam 158, the cam follower 160, the pin 146, and the flow directing housing 144. The shutter 150 includes a shutter body 151 having a cam aperture 149 defined therethrough. The shutter 150 may be a substantially obround shape with two parallel constraining edges 254 formed on opposing ends. In particular, the shutter body 151 may have two relatively straight constraining edges 254 formed at opposite ends from one another and two curved edges 256 formed on opposite sides from one another. In one embodiment, the curved edges 256 form the longitudinal edges for the shutter body 151 and the constraining edges 254 form the lateral edges. However, in other embodiments, the shutter 150 may be otherwise configured.

As shown in FIG. 6, the shutter body 151 is a solid section of material with curved side sections 280 corresponding to the curved edges 256 and a top section 282 and a bottom section 284, both corresponding to the constraining edges 254. The curved side sections 280 are wider than the top 282 and bottom sections 284. The cam aperture 149 may be a generally obround-shaped aperture defined in the center of the shutter body 151 and defining an interior side wall 155. As shown in FIG. 6, the longer interior side wall 155 edges of the obround-shaped cam aperture 149 may correspond to the curved edges 256 of the shutter 150, and the shorter, curved interior side wall 155 edges of the cam aperture 149 may correspond to the constraining edges 254. The curved side sections 280 of the shutter body 151 are formed on opposing sides of the cam aperture 149, the top section 282 is formed above the cam aperture 149, and the bottom section 284 is formed below the cam aperture 149.

The turbine 148 may have a circular body 163 and a plurality of blades 153 extending radially from a central hub 161. The central hub 161 is a generally circular shape with a pin-receiving hole 147 defined through its center. The blades 153 each have an inner end portion 292 closest to the central hub 161 and an outer end portion 290 that may include grooves 294. Each blade 153 may have a height that is substantially the same or slightly larger than the diameter of the inlets, or flow directing apertures 156, on the flow directing housing 144 as shown in FIG. 5B. The positioning of the flow directing apertures 156 around the peripheral edge of the flow directing housing 144 allows for smaller blades than those required by existing "end feeding" systems that have fluid inlets on a front or rear surface of the engine housing, and not on a peripheral edge. Taller blades are necessary for traditional end feeding systems in order to allow water flowing from above or below the blade to contact a blade along a height of the blade surface for an adequate period of time. Although eight blades 153 have been illustrated, the turbine 148 may include fewer or more blades 153.

Figure 17A:
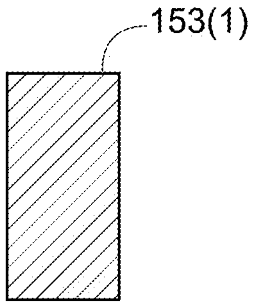
FIGS. 17A-D are schematic diagrams of alternate shapes of a turbine blade in cross-section.
Figure 17B:
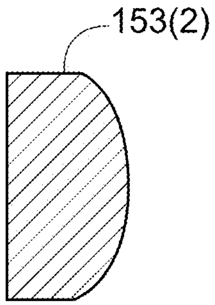
Figure 17C:
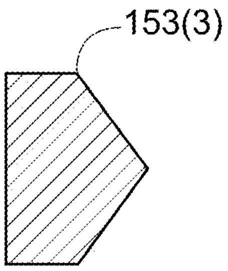
Figure 17D:
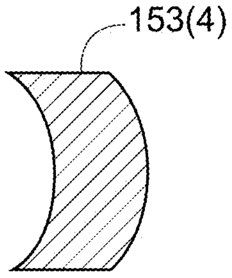

Alternate blade shapes are also contemplated, as shown in the blade cross-sections in FIGS. 17A-D. FIG. 17A shows a cross-section of a square blade 153(1). FIG. 17B shows a blade with a leading edge curve 153(2), FIG. 17C shows a blade with a leading point 153(3), and FIG. 17D shows a blade with a curved, bucket shape 153(4). The blade shapes depicted in FIGS. 17B-D may reduce fluid resistance on the turbine 148 as it spins through the turbine chamber 196. The curved, bucket-shaped blade 153(4) may also improve efficiency of fluid capture by the blade 153(4). While four blade shapes are depicted in FIGS. 17A-D, other blade shapes are contemplated to improve efficiency of rotation and reduce resistance.

The circular body 163 of the turbine 148 surrounds the central hub 161 and is positioned in between the inner end portions 292 of the blades 153. The circular body 163, or portions thereof, may be omitted in some embodiments.

The cam 158 may be a cylindrically shaped disk, an eccentric, and/or a concentric ring, or the like. The cam 158 defines an aperture therethrough that defines an interior surface 159. The cam follower 160, as shown in FIG. 8, has a generally cylindrical shape with an aperture defined longitudinally through its center. The pin 146 is an elongate cylindrical shape; however, the pin 146 may be any shape that allows another object to rotate about its axis. For example, the pin 146 may be a spindle, axle, dowel, or other similar connecting member.

Figure 7B:
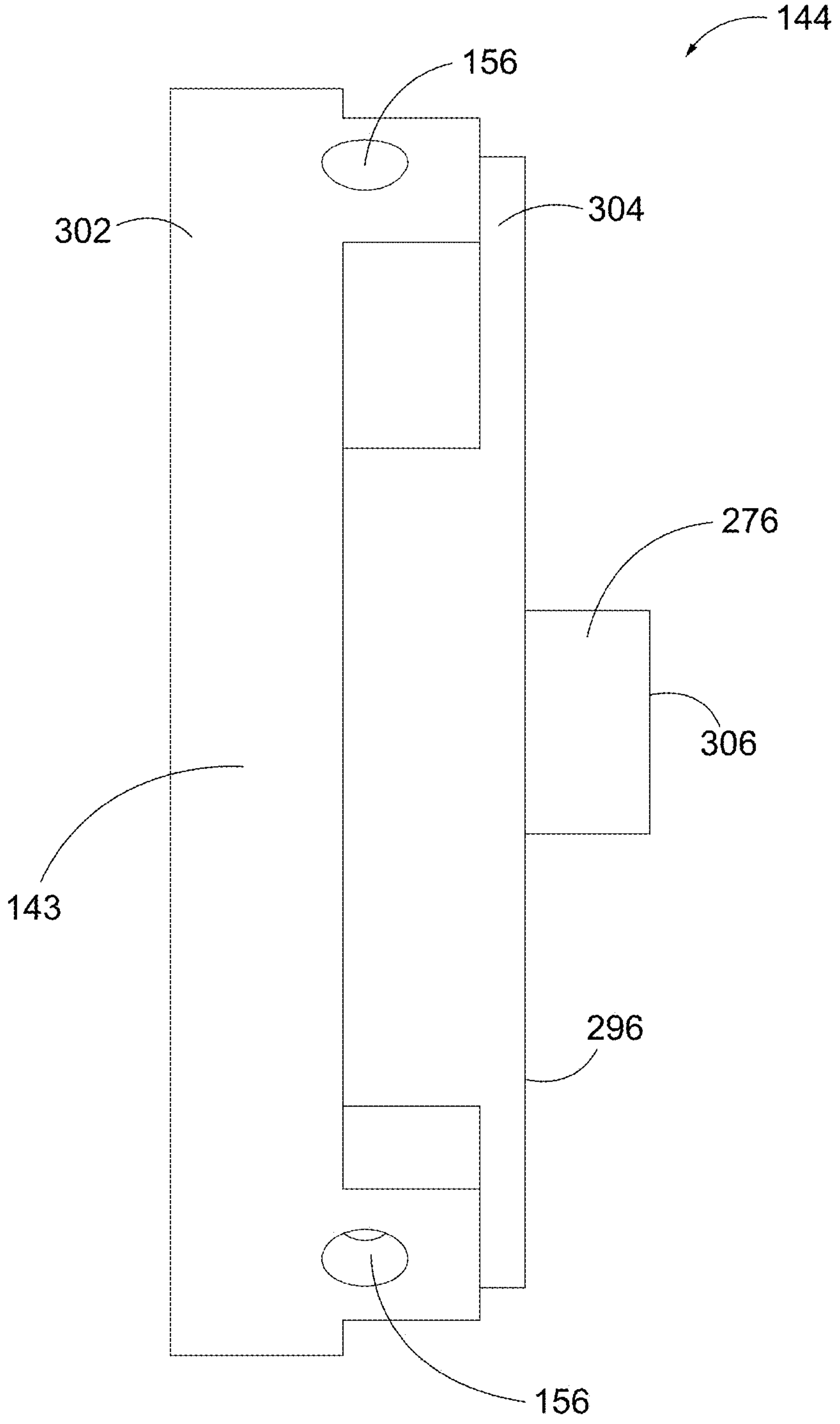
FIG. 7B is a right side elevation view of the flow directing housing of FIG. 7A.

FIGS. 7A and 7B show different views of the flow directing housing 144 of the engine 142. In several embodiments, the flow directing housing 144 is a circular shape; however, the housing 144 may be of various shapes compatible with the shape of a showerhead. The flow directing housing 144 has an outer wall 143, an inner ledge 145, and a back wall 141, which together define a cavity. A plurality of flow directing apertures 156 are positioned within the outer wall 143. The flow directing apertures 156 extend through the outer wall 143 to the inner ledge 145, creating a passageway from outside the flow directing housing 144 through the interior of the flow directing housing 144. The flow directing apertures 156 may extend through the outer wall 143 and inner ledge 145 at an angle, such as, for example, an angle less than 90 degrees. A portion of the inner ledge 145 may be removed in front of the flow directing apertures. As shown in FIG. 7A, a triangular portion of the inner ledge 145 is recessed in front of each outlet of each flow directing apertures 156. As shown in FIG. 16B, this arrangement provides a flat face for the outlets of each flow directing aperture 156 in a perpendicular orientation to the axis of the flow directing apertures 156 to provide a true nozzle exit surface. In other embodiments, the inner ledge 145 may not be formed and the flow directing apertures 156 may extend through only the outer wall 143. For example, the flow directing apertures 156 may extend through the curved surface of the outer wall 143 such that the faces of the outlets of the flow directing apertures 156 are curved and not entirely perpendicular to the axis of the flow directing apertures 156. While three flow directing apertures 156 are shown in the embodiment of FIGS. 7A and 16B, any number of flow directing apertures are contemplated. As shown in FIG. 7A, the flow directing housing 144 may include a pin recess 157 in the center of the back wall 141. The pin recess 157 may be a circular recessed portion.

As shown in FIG. 7B, the outer wall 143 may include a raised portion 302 and a recessed portion 304; however, it is contemplated that the outer wall 143 may have a continuous surface. In the depicted embodiment, the flow directing apertures 156 are positioned on the raised portion 302 of the outer wall 143 at least partially above the recessed portion 304; however, the flow directing apertures 156 may also be positioned on the recessed portion 304 of the outer wall 143 or may be in a different position based on the surface of the outer wall 143. The flow directing housing 144 may include a rear extension 276. The rear extension 276 may extend out from a back surface 296 of the flow directing housing 144. The rear extension 276 may be a generally spherical shape with a curved circumference and a flat rear surface 306. The rear extension 276 may define the pin recess 157.

Figure 5A:
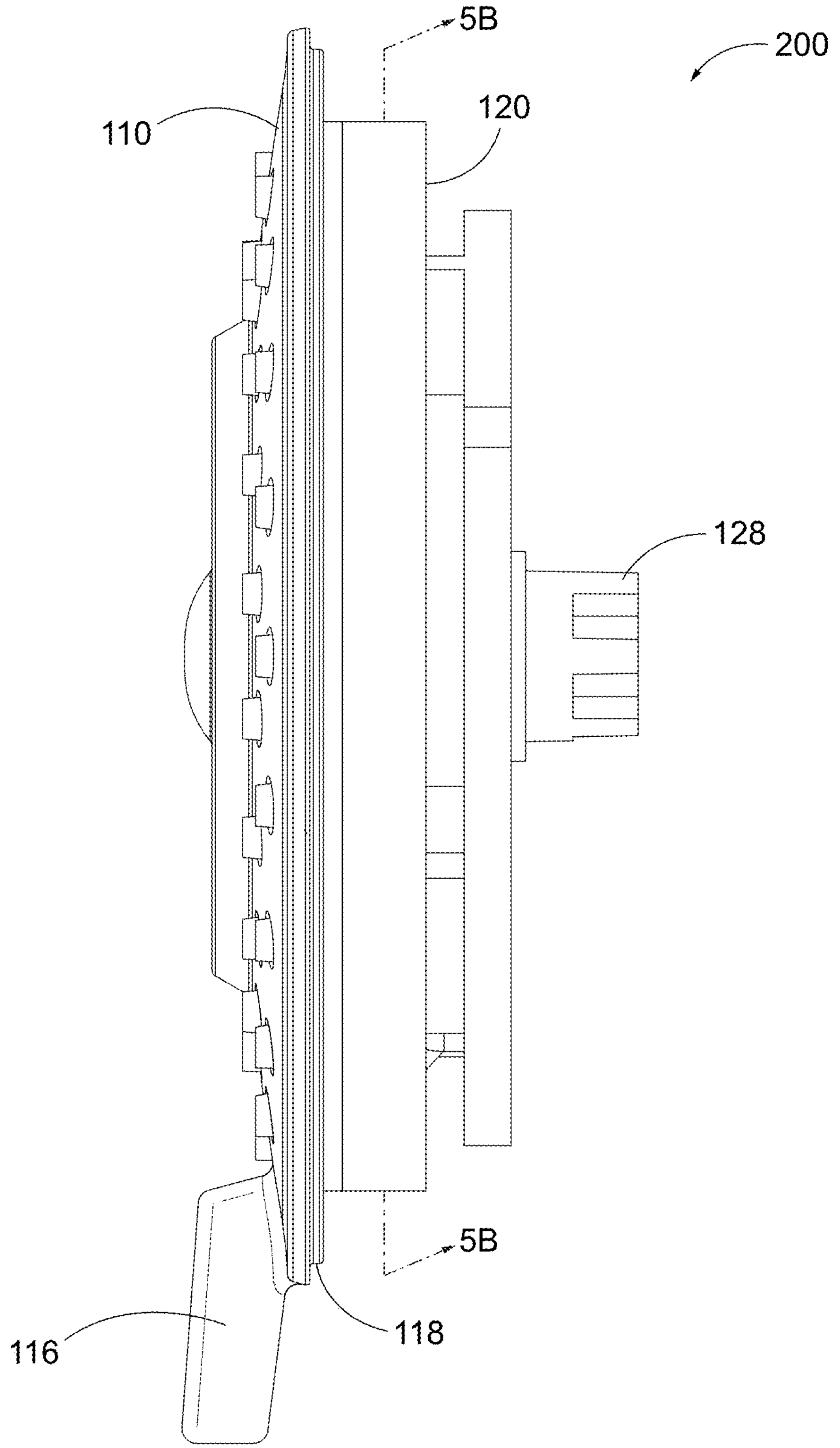
FIG. 5A is a right side elevation view of the engine enclosure of FIG. 4.
Figure 5B:
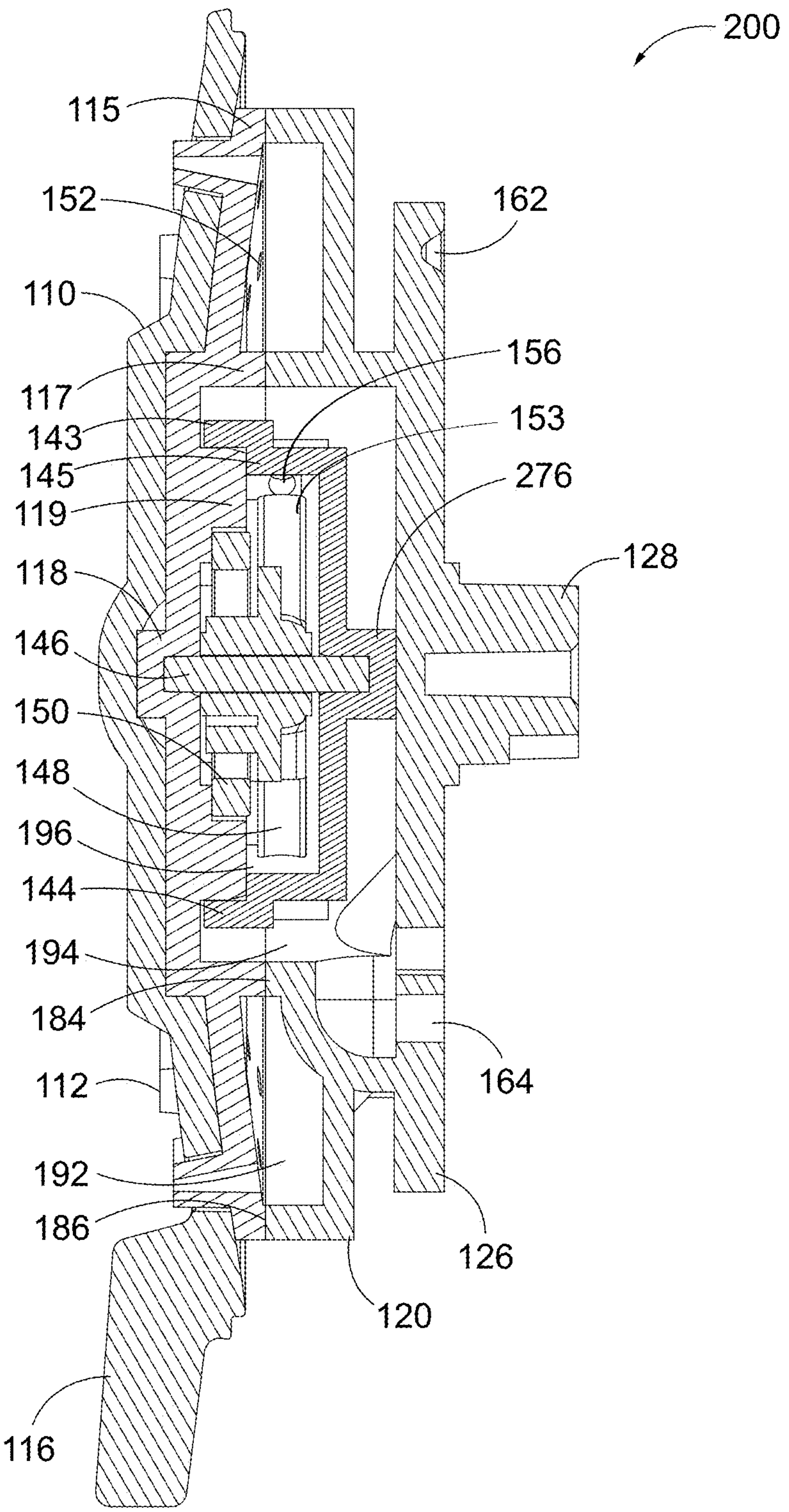
FIG. 5B is a right side elevation view in cross-section of the engine inside the engine enclosure of FIG. 4 as indicated by line 5B-5B in FIG. 5A.

As shown in FIGS. 2 and 5A-B, the engine housing 120 may be positioned around the pulsed spray engine 142, forming the rear side of the engine enclosure 200. With reference to FIGS. 5B, 10, 13, and 14, the engine housing 120 may have a front plate 124 and a back plate 126 with a plurality of detent recesses 162 (e.g., detent recesses 162*a-c*), a plurality of mode apertures 164 (e.g., mode apertures 164*a,b*), and a key 128. The back plate 126 may be raised from the front plate 124 on a back side of the engine housing 120. The back plate 126 is generally a circular shape with an outer edge 125. The outer edge 125 may define a plurality of ledges 127. In the depicted embodiment, the outer edge 125 defines two ledges 127. In one embodiment, the back plate 126 may seat flat on the front plate 124. Alternatively, the back plate 126 and front plate 124 may constitute a single plate attached to the face plate 110. In these embodiments, the back plate 126 may not include the ledges 127, depending upon the interface of the spray chamber housing 202.

Figure 10:
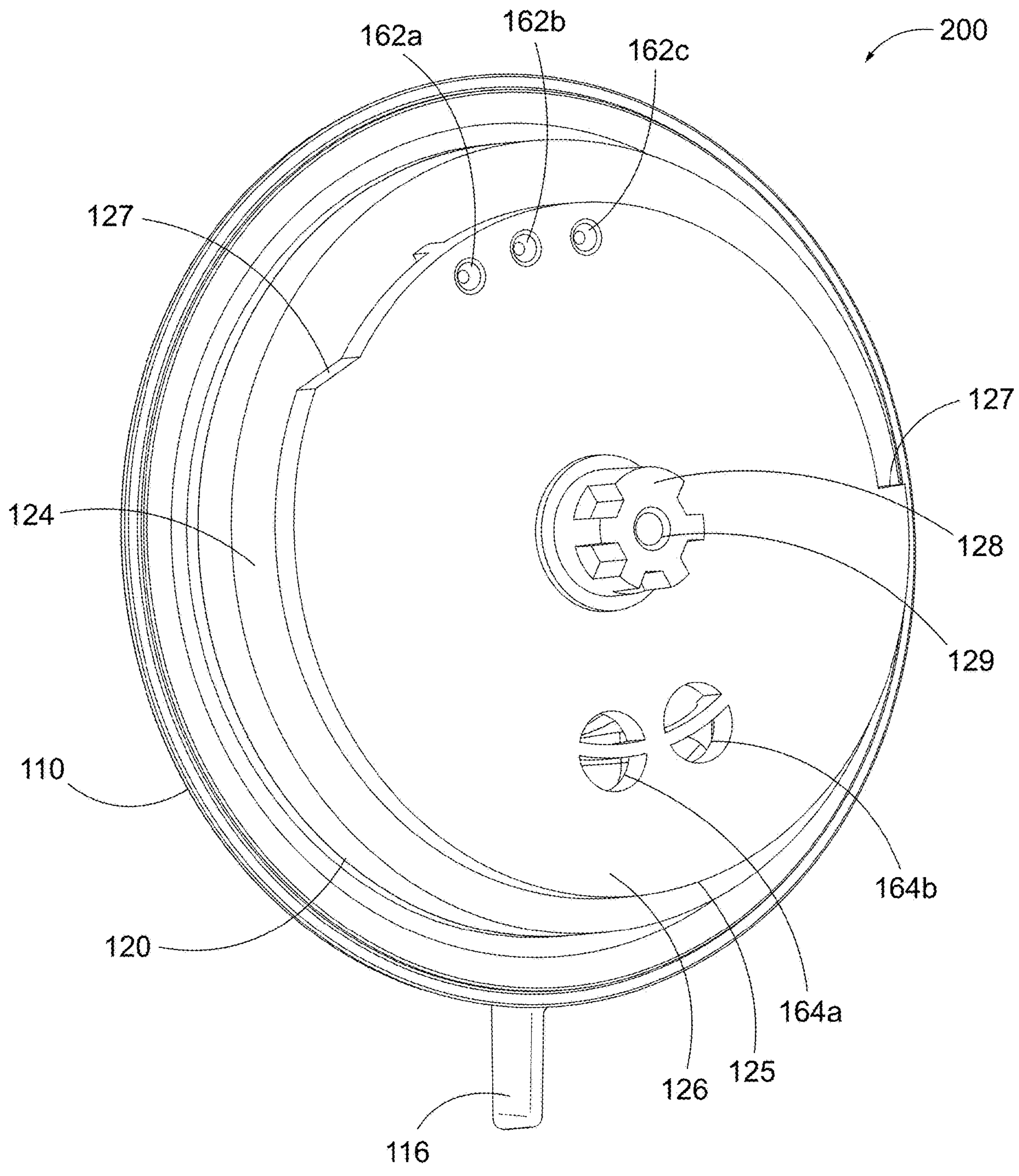
FIG. 10 is a rear isometric view of the engine enclosure of FIG. 4.

In the embodiment shown in FIG. 10, the plurality of detent recesses 162*a-c* are defined by an upper portion of the back plate 126. The detent recesses 162*a-c* are each a generally circular shape. The plurality of detent recesses 162*a-c* may be arranged adjacent to one another forming a curved line that generally matches the curvature of the outer edge 125 of the back plate 126. In the depicted embodiment, there may be three detent recess 162*a-c* defined by the back plate 126; however, the number of recesses 162*a-c* may be based on a desired number of modes for the showerhead 100. Thus, as the number of modes varies, so may the number of detent recesses 162*a-c*.

FIG. 10 shows two mode apertures 164*a,b* defined within a lower portion of the back plate 126. Both are circularly shaped apertures with a bar running through the center. The number of mode apertures 164*a,b* may vary depending upon the desired number of modes for the showerhead 100. In addition, the shape of the mode apertures may vary. For example, the mode apertures may be triangularly or rectangular shaped apertures or the like. Additionally, there may be no bar running through the center of the mode apertures 164*a,b* or there may be several bars running horizontally and/or vertically across the mode apertures 164*a,b*.

Figure 14:
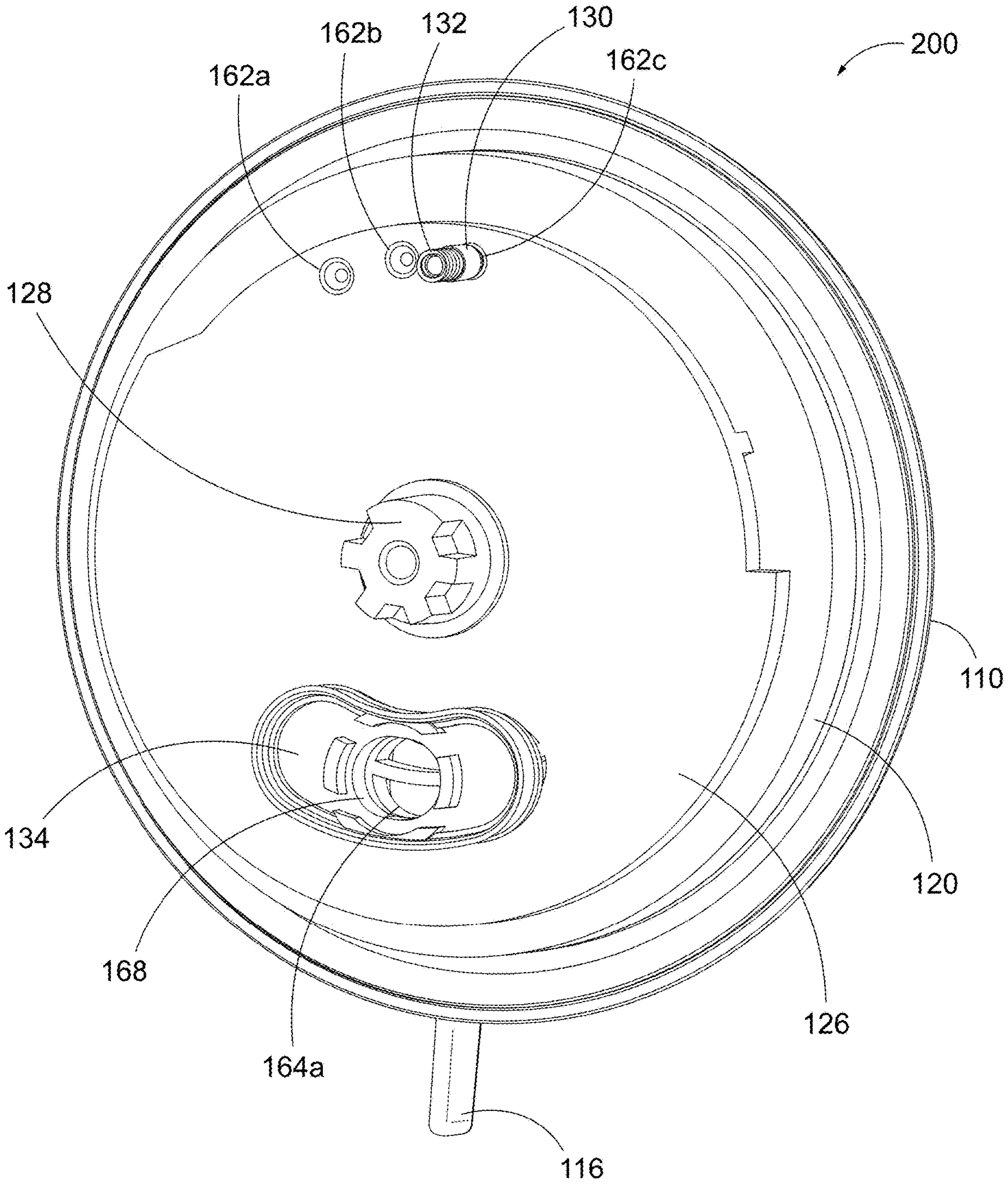
FIG. 14 is a rear isometric view of the engine enclosure of FIG. 4 with a mode seal and a plunger with a spring.

The engine housing 120 may include a key 128. The key 128 forms a protrusion on the back plate 126, extending a length away from the back plate 126. As shown in FIGS. 10 and 14, the key 128 is centrally positioned on the back plate 128 in between the detent recesses 162*a-c* and mode apertures 164*a,b*. The key 128 has a circular base with a five prong shape extending outwards from the base. The prongs are defined by five indents that are defined within the outer circumference of the key. One of the prongs in the five prong shape has a larger width and a curved surface that is differently configured from the other prongs. The key 128 includes a fastening cavity 129, which is a generally circular in shape defined within the center of the key 128. The fastening cavity 129 may extend to a depth that is the entire length of the key 128 or it may only extend to a depth that is a portion of the length of the key 128.

Figure 13:
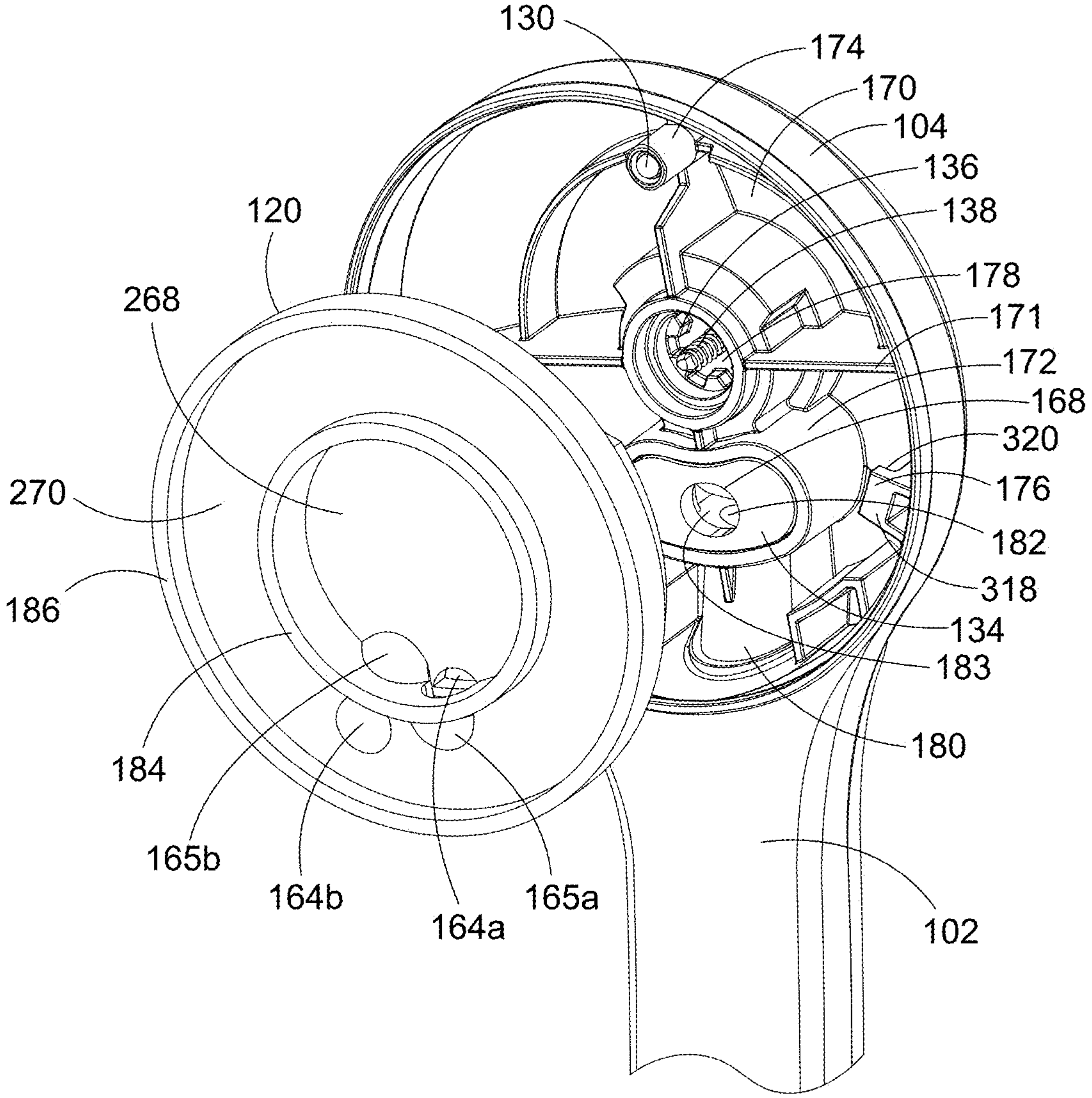
FIG. 13 is an exploded front isometric view of the spray chamber housing of FIG. 11 with an engine housing of the showerhead of FIG. 1A.

With reference to FIG. 13, the front surface of the engine housing 120 may include an outer wall 186 and an inner wall 184. The inner wall 184 may form a circle enclosing an inner housing enclosure 268. The outer wall 186 may form a circle around the inner wall 184 spaced a distance away from the inner wall 184. The outer wall 186 and the inner wall 184 may form an outer housing enclosure 270. A mode aperture 164*a* is defined within the inner housing enclosure 268 and the other mode aperture 164*b* is defined within the outer housing enclosure 270. In the embodiment shown, the mode apertures 164*a*, 164*b* are positioned on the back side of the inner wall 184. A partial raised dome 165*a* is formed within the outer housing enclosure 270 forming a wall portion of the mode aperture 164*a* extending through the engine housing 120 from the back plate 126 to the outer housing enclosure 270. Another partial raised dome 165*b* is formed within the inner housing enclosure 268 forming a wall portion of the mode aperture 164*b* extending through the engine housing 120 from the back plate 126 to the inner housing enclosure 268.

Figure 11:
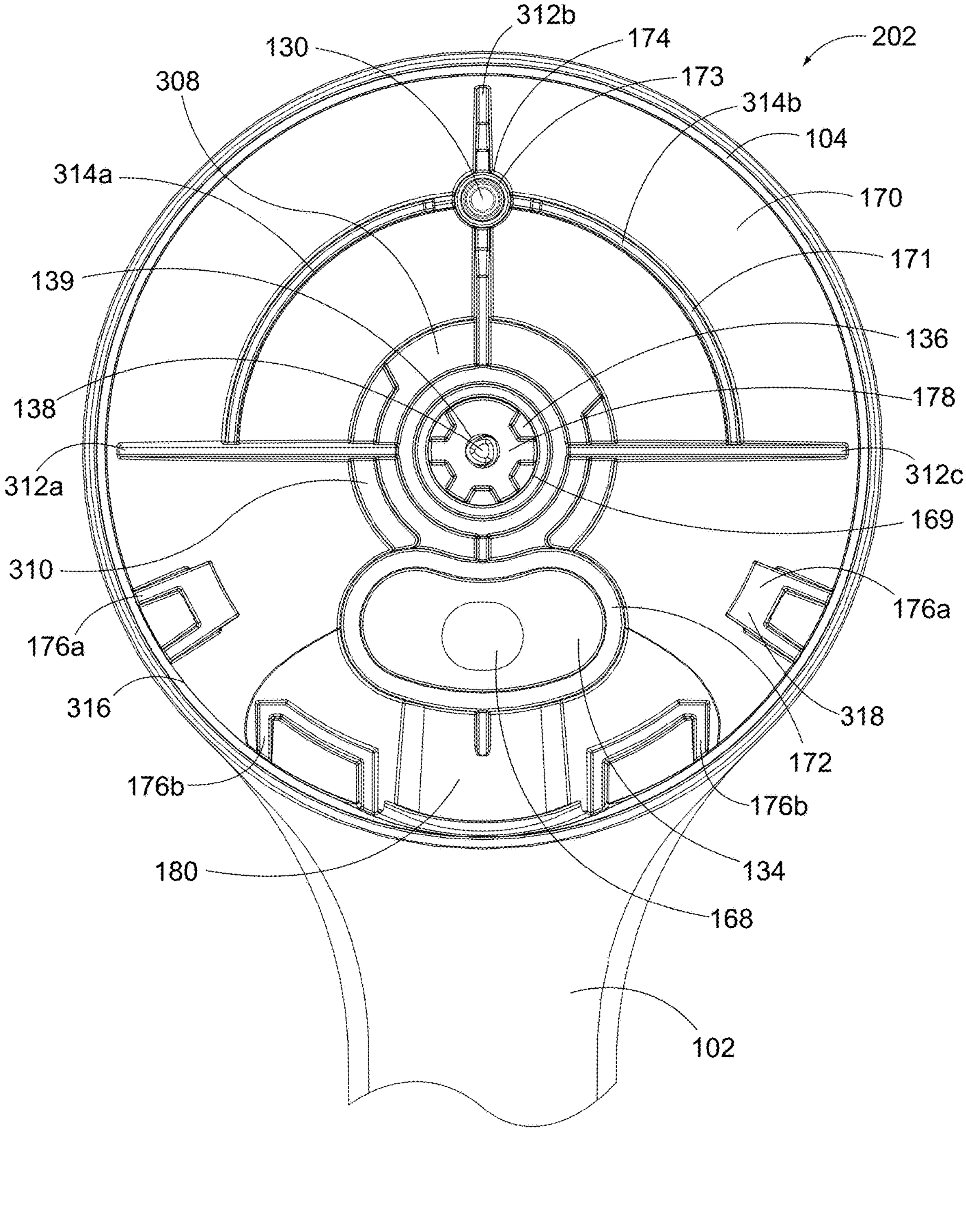
FIG. 11 is a front elevation view of a spray chamber housing of the showerhead of FIG. 1A.

The spray chamber housing 202 will not be discussed in more detail. As shown in FIG. 11, the spray chamber housing 202 may include a spray head 104 with an interior surface 170 and a peripheral edge 316, a mounting plate 171, a sealing wall 172, a fluid inlet channel housing 180, a plurality of positioning tabs 176, a mode seal 134, a keyed washer 136 with a keyed cavity 178, and a plunger 130 with a spring 132.

The mounting plate 171 may be positioned on or extend from the interior surface 170 of the spray head 104. The mounting plate 171 in the depicted embodiment has a generally circular central portion 308 with a plurality of recessed portions 310. A plurality of support plates 312*a-c* may extend radially from the central portion 308. In the depicted embodiment, three support plates 312*a-c* may extend from the central portion 308 and are positioned perpendicular to one another. The support plates 312*a-c* may include a right support plate 312*a*, a top support plate 312*b*, and a left support plate 312*c*. The right and left support plates 312*a,c* may be coupled to the top support plate 312*b* by right and left curved support plates 314*a,b*. Other configurations of the mounting plate 171 are contemplated.

The mounting plate 171 may include a central aperture 169 and a detent wall 174. As shown in FIG. 11, the central aperture 169 is defined within the central portion 308 of the mounting plate 171 in a center portion of the spray head 104. The central aperture 169 may be a generally circular shape. The detent wall 174 may be positioned on the top support plate 312*b* of the mounting plate 171 above the central aperture 169 in an upper portion of the spray head 104. The right and left curved support plates 314*a,b* may couple to opposing sides of the detent wall 174. The detent wall 174 defines a detent cavity 173. The detent cavity 173 may be a generally circular shape.

A sealing wall 172 and fluid inlet channel housing 180 are positioned below the central portion 308. The sealing wall 172 may form a kidney shape, oval shape, rectangular shape, or the like. The sealing wall 172 partially encloses the fluid inlet chamber 183, as shown in FIG. 3. The fluid inlet channel housing 180 may be positioned below the sealing wall 172 and may extend from the interior surface 170 and a bottom portion of the spray head 104. As shown in FIG. 11, the fluid inlet channel housing 180 may have a rounded surface with two flat side walls; however, other shapes are contemplated such as, for example, a parabolic shape. The fluid inlet channel housing 180 defines the fluid inlet channel 182. Both the fluid inlet channel housing 180 and sealing wall 172 may be positioned on an opposite side of the central portion 308 from the detent wall 174.

A plurality of positioning tabs 176 may be positioned along or extend from the peripheral edge 316 of the spray head 104. In the depicted embodiment, four positioning tabs, including outer positioning tabs 176*a* and inner positioning tabs 176*b*, extend from both the peripheral edge 316 and the interior surface 170 of the spray head 104; however, it is contemplated that the positioning tabs 176*a,b* may extend from only one of the peripheral edge 316 or interior surface 170, and any number of positioning tabs is contemplated. As shown, the positioning tabs 176*a,b* may be positioned along the peripheral edge 316 on a lower portion of the spray head 104 and may be spaced apart on either side of the fluid inlet channel housing 180. The outer positioning tabs 176*a* may have a flat front face 318 and a recessed groove 320 on the back side that extends to the interior surface 170, as best shown in FIG. 13. The inner positioning tabs 176*b* may form an arc shape on the peripheral edge 316. While only four positioning tabs 176*a,b* are depicted, any number of positioning tabs is contemplated and the shapes of the positioning tabs 176*a,b* may vary depending on the interface of the engine enclosure 200.

The mode seal 134 may be positioned within a front portion of the sealing wall 172. The mode seal 134 may be a kidney shape, oval shape, rectangular shape, or the like, depending upon the corresponding shape of the sealing wall 172. The mode seal 134 includes an inlet aperture 168 that allows fluid to flow through the mode seal 134. As shown in FIG. 11, the inlet aperture 168 is positioned centrally within the mode seal 134; however, it is contemplated that the positioning and the number of inlet apertures 168 may vary depending upon the desired fluid flow. As shown in FIG. 14, the mode seal 134 is configured to seal against the back plate 126. The mode seal 128 may be a sealing material, such as rubber or another elastomer.

Figure 12:
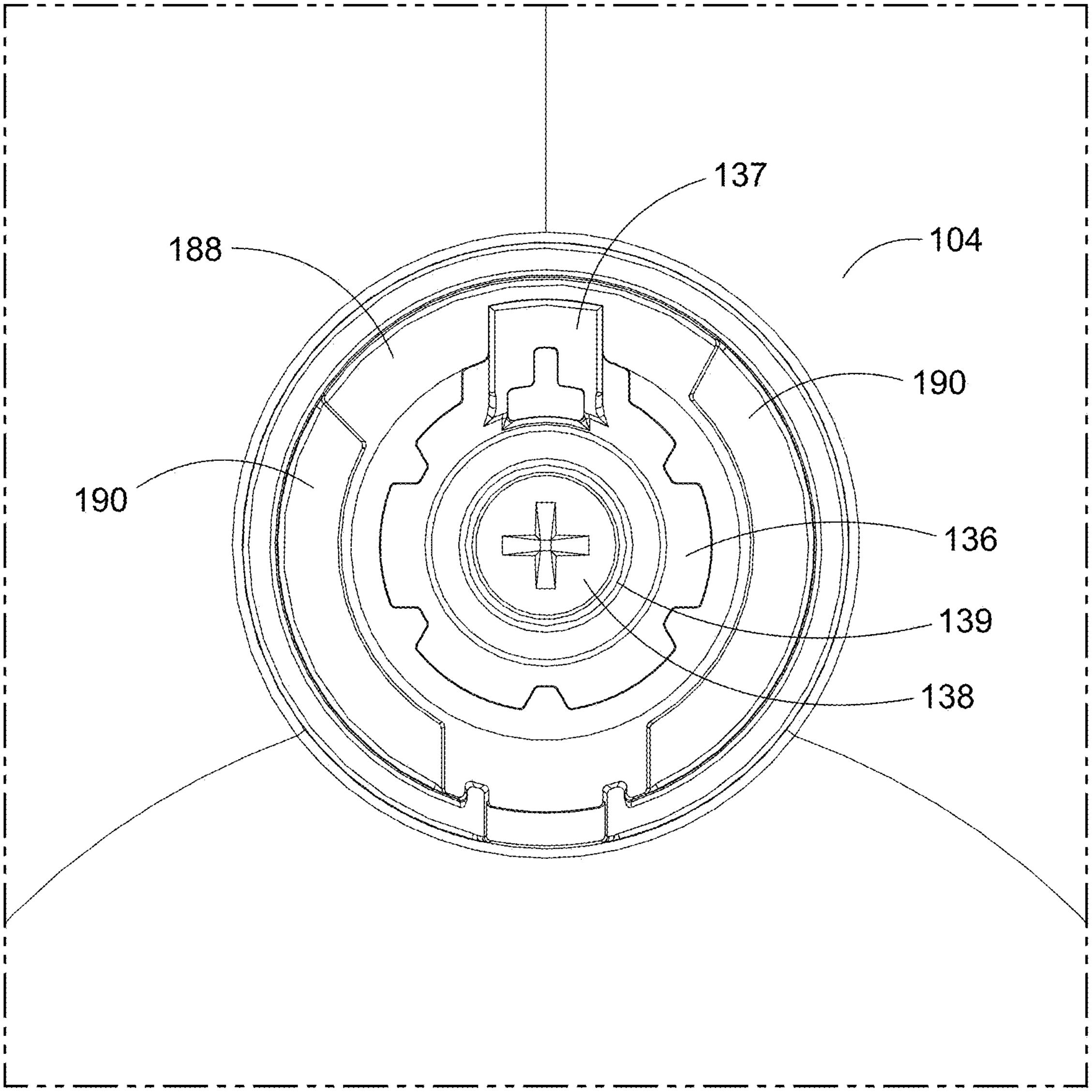
FIG. 12 is a rear elevation view of a cap cavity of the showerhead of FIG. 1A.

In the depicted embodiment, the keyed washer 136 may be positioned within the central aperture 169 of the mounting plate 171. The keyed washer 136 may include a keyed cavity 178 recessed within the keyed washer 136. The keyed cavity 178 may have a varying shape including a plurality of keyed protrusions, angled sidewalls, or other keying elements configured to correspond to the key 128 on the back plate 126. In the embodiment shown, the keyed cavity 178 may have a five prong shape with one of the prongs having a larger width and a curved surface that is differently configured from the other prongs. The center of the keyed washer 136 includes a fastening aperture 139 defined therethrough. It should be noted that the shape and configuration of the keying features of the keyed washer 136 shown in FIG. 11 are meant as illustrative only and many other keying features are envisioned. As shown in FIG. 12, the back side of the keyed washer 136 may include a washer stop 137 extending outward from a sidewall of the keyed washer 136. As shown, the washer stop 137 extends from the prong with the larger width; however, other configurations are contemplated.

A plunger 130 may be positioned within the detent cavity 173. As shown in FIGS. 2 and 13, the plunger 130 has a generally spherical bullet-like shape. The plunger 130 has a front end 286 and a back end 288. The front end 286 of the plunger 130 may be larger than the back end 288. As shown, the back end 288 forms a tail-like structure extending from the front end 286. A biasing element, such as spring 132, seats behind the plunger 130 inside the detent wall 174.

As shown in FIG. 12, a back side of the spray head 104 may include a cap cavity 188. The cap cavity 188 forms a generally circular aperture on the back side of the spray head 104. The cap cavity 188 may correspond to the central aperture 169 of the mounting plate 171 and further receive the keyed washer 136. The cap cavity 188 may include keying walls 190 positioned on opposing sides of the cap cavity 188. The keying walls 190 may be curved walls, matching the shape of an outer wall of the cap cavity 188, and may be of varying lengths with a gap therebetween. The cap 140, shown in FIG. 2, is received into the cap cavity 188. The cap 140 may have a generally round shape. The cap 140 may have a front side 324 that interfaces with the showerhead 100 and a back side 326 that is exposed on the surface of the showerhead 100. The front side 324 may have various protrusions for attaching to the showerhead 100. The back side 326 may have a smooth surface and may be rounded.

Assembly of the Showerhead

With reference to FIGS. 2 and 3, assembly of the showerhead 100 will now be discussed in more detail. At a high level the engine enclosure 200 is assembled and then connected to the spray head 104, as will be discussed in more detail below. To assemble the engine enclosure 200, the pulsed spray engine 142 may be assembled and then attached to the nozzle membrane 118 and face plate 110, and then the engine housing 120 may be attached to the faceplate 110 and/or engine 142. As shown in FIGS. 6 and 8, the shutter 150 seats behind the nozzle membrane 118 and face plate 110, and the cam 158, the cam follower 160, and the turbine 148 are positioned behind the shutter 150. The turbine 148 may be oriented so that the cam 158 is located on the opposite side of the turbine 148 that faces the flow directing housing 144. The pin 146 may be received into the pin recess 157 in the back wall 141 of the flow directing housing 144 of the pulsed spray engine 142. The pin 146 may be further received through the pin-receiving hole 147 in the central hub 161 of the turbine 148, through the aperture in the cam follower 160, through the aperture in the cam 158, and through the cam aperture 149 of the shutter 150. The pin recess 157 and the aperture in the cam follower 160 may have a diameter that is generally the same size as the diameter of the pin 146. In this configuration, the turbine 148, the cam follower 160, the cam 158, and the shutter 150 are all coupled to the flow directing housing 144, with the turbine 148 adjacent to the back wall 141 of the flow directing housing 144. The turbine 148 is able to rotate about the pin's 146 axis. The cam follower 160 may be positioned within the aperture in the cam 158. The cam 158 may be positioned off-center from the central hub 161 of the turbine 148 and seats within the cam aperture 149 of the shutter 150. The width of the cam aperture 149 is selected to substantially match the diameter of the cam 158; however, the length of the cam aperture 149 is longer than the diameter of the cam 158. It is contemplated that the cam 158 and cam follower 160 may be integral with the turbine 148 or they may be separate components coupled to the turbine 148 via the pin 146.

As shown in FIGS. 4 and 6, the nozzle membrane 118 may be connected to the face plate 110. The individual rubber nozzles in the nozzle arrays 112 and 114*a,b* on the nozzle membrane 118 may be inserted into the respective nozzle openings 113 on the face plate 110. Rubber nozzles may be more easily cleaned. For example, during use, the nozzles may be become clogged with sediment or calcification of elements from the water supply source. With rubber nozzles, the nozzles can be deformed or bent to break up the deposits, which are flushed out of the nozzles, whereas with non-flexible nozzles, the nozzles may have to be soaked in a chemical cleaning fluid or cleaned through another time consuming process.

Once the pulsed spray engine 142 and face plate-nozzle membrane have been constructed, the pulsed spray engine 142 may be connected to the nozzle membrane 118 and face plate 110. With reference to FIGS. 5B and 6, the inner membrane recess 272 of the nozzle membrane 118 may receive a portion of the flow directing housing 144 of the pulsed spray engine 142. For example, as shown, the inner membrane recess receives a portion of the outer wall 143 of the flow directing housing 144. At least part of the flow directing housing 144 may seat on top of the inner membrane platform 119. For example, as shown, the inner membrane platform 119 interfaces with the ledge 145 on the flow directing housing 144. This configuration creates a turbine chamber 196 between the flow directing housing 144 and the shutter recess 121 of the nozzle membrane 118 including the apertures 154*a,b*, associated with the second nozzle array 114*a,b*. In this manner, the turbine chamber 196 houses the various pulsed spray engine 142 components described in more detail above. The reduced height of the turbine blades 153, as compared to traditional turbine-powered shower engines, may allow for a smaller turbine chamber 196, reducing the overall height or thickness of the engine 142 and, thus, the thickness of the showerhead 100. For example, the engine 142 of the present disclosure may be half the height of a traditional showerhead engine.

Within the turbine chamber 196, the pin 146 may be positioned within the pin-receiving recess 111 located within the shutter recess 121 on the nozzle membrane 118. The pin-receiving recess 111 may have a diameter that is generally the same size as the diameter of the pin 146. The shutter recess 121 forms the same general shape as the shutter 150, and the shutter 150 is oriented such that the constraining edges 254 are parallel to the constraining walls 264 of the shutter recess 121, and the curved edges 256 of the shutter 150 align with the curved walls 266 of the shutter recess 121. The shutter recess 121 is larger than the shutter 150 to allow the shutter 150 to move back and forth when the shutter 150 is received within the shutter recess 121. The curved side sections 280 of the shutter body 151 are able to cover all apertures within either the apertures 154*a* or 154*b* within the shutter recess 121, depending upon the positioning of the shutter 150 within the shutter recess 121. For example, if the shutter 150 is positioned to the right side of the shutter recess 121, given the perspective shown in FIG. 6, the shutter 150 covers apertures 154*a*. If the shutter 150 is positioned to the left side of the shutter recess 121, the shutter 150 covers apertures 154*b*.

After the pulsed spray engine 142 is assembled and aligned with the nozzle membrane 118 and face plate 110, the engine housing 120 is coaxially aligned with the nozzle membrane 118 and face plate 110. With reference to FIGS. 5B and 6, the outer wall 186 of the engine housing 120 is aligned with the outer membrane ring 115 and the inner wall 184 of the engine housing 120 is aligned with the inner membrane ring 117 such that the outer housing enclosure 270 seats above the outer membrane recess 274 and the inner housing enclosure 268 seats above both the inner membrane recess 272 and the shutter recess 121. In this manner, the outer housing enclosure 270, including mode aperture 264*b* defined therethrough, forms an outer fluid distribution chamber 192 with the outer membrane recess 274 and the apertures 152 associated with the first nozzle array 112. The inner housing enclosure 268, including mode aperture 264*a* defined therethrough, forms an inner fluid distribution chamber 194 with the inner membrane recess 272 and the flow directing housing 144. Because the flow directing apertures 156 are positioned around the peripheral edge of the flow directing housing 144, and the engine 142 does not include jets on its rear face, such as in traditional "end feeding" systems, the inner fluid distribution chamber 194 may be thinner, and thus the overall engine enclosure 200 may have a reduced height of thickness. In embodiments where the flow directing housing 144 includes a rear extension 276 on the back surface 296 of the flow directing housing 144, the rear extension 276 may seat on the inner housing enclosure 268, providing a buffer between the pulsed spray engine 142 and the inner housing enclosure 268 to create additional space within the inner fluid distribution chamber 194 for fluid to flow, as will be discussed more below. The inner fluid distribution chamber 194 is fluidly connected to the turbine chamber 196. The alignment of the engine housing 120 with the nozzle membrane 118 therefore defines two different flow paths associated with different modes. One flow path extends through mode aperture 164*b*, into the outer fluid distribution chamber 192, and ends at the apertures 152, which are associated with the nozzles in the first nozzle array 112 on the face plate 110 and a constant flow mode. The other flow path extends through mode aperture 164*a*, into the inner fluid distribution chamber 194, into the turbine chamber 196, and ends at the apertures 154*a,b*, which are associated with the nozzles in the second nozzle array 114*a,b* on the face plate 110 and a pulsating flow mode. The number of flow paths and modes are meant to be illustrative only and the number of flow paths and number and types of modes may be varied as desired.

The engine housing 120 may also be aligned with and coupled to the face plate 110. The perimeter wall of the engine housing 120 is aligned with the perimeter wall of the face plate 110 so as to engage one another. It is contemplated that the coupling of the engine housing 120 to the nozzle membrane 118, face plate 110, and/or pulsed spray engine 142 is by conventional means, such as, for example, welding, heating, adhesive, or other techniques that secure the parts together. As one example, ultrasonic welding may be applied to the engine enclosure 200 once all components are aligned in order to weld all points of contact between the various components. Once secured, the face plate 110, nozzle membrane 118, pulsed spray engine 142, and engine housing 120 form the engine enclosure 200 of the showerhead 100. This allows the engine enclosure 200 to be connected to the spray head 104 as a single component, rather than individually attaching each of the components. Additionally, the connection between each of the engine enclosure 200 components may be substantially leak proof such that water flowing through each of the chambers within the enclosure 200 is prevented from leaking into other chambers. As mentioned, the shorter height of the turbine blades 153 may allow for a smaller turbine chamber 196 and engine 142, and the peripheral arrangement of the flow directing apertures 156 may allow for a thinner inner fluid distribution chamber 194. This in turn may also allow for a reduced height or thickness of the engine enclosure 200 as compared to traditional systems.

With reference to FIGS. 3 and 11, the various components of the spray chamber housing 202 may be assembled. The fluid inlet channel housing 180 may seat within the spray chamber housing 202 adjacent to the handle 102. Both the handle 102 and the fluid inlet channel housing 180 define the fluid inlet channel 182, which fluidly connects the spray chamber housing 202 to the fluid inlet 108, as shown in FIG. 3. The fluid inlet channel housing 180 couples to the sealing wall 172, which defines the fluid inlet chamber 183. The fluid inlet chamber 183 is fluidly connected to the fluid inlet channel 182 and the inlet 108. The mode seal 134 may be positioned within the sealing wall 172 in front of the fluid inlet chamber 183. The sealing wall 172 may be substantially the same shape as the mode seal 134 to create a seal between the sealing wall 172 and the mode seal 134 when the mode seal 134 is positioned within the sealing wall 172. The spring 132 may be received around the back end 288 of the plunger 130 and the plunger 130 and spring 132 may be received into the detent cavity 173 within the detent wall 174 of the mounting plate 171. The spring 132 is configured to bias the plunger 130 against the back plate 126 of the engine housing 120.

The mounting plate 171 may be an integral component of the spray head 104; however, it is also contemplated that the mounting plate 171 is a separate component. In the case where the mounting plate 171 is a separate component, the mounting plate 171 is connected to the spray head 104. The mounting plate 171 may be attached to the spray head 104 by conventional fasteners.

The engine enclosure 200 may be connected to the mounting plate 171 or directly to the spray head 104. Because the engine enclosure 200 may be secured together as a single component, the engine enclosure 200 can be quickly attached and detached from the spray head 104, for example, by a snap-fit connection to the mounting plate 171. Depending on the embodiment, the keyed cavity 178 may be positioned on the mounting plate 171 or directly on the spray head 104. In either case, the key 128 on the back plate 126 of the engine housing 120 of the engine enclosure 200 fits into the keyed cavity 178 to couple the engine enclosure 200 to the spray chamber 202; however, other conventional fastening methods are contemplated to removably attach the engine enclosure 200 to the spray chamber housing 202. In the embodiment shown in FIG. 11, the keyed cavity 178 has the same shape as the key 128 shown in FIG. 10, allowing the key 128 to fit. As shown, the keyed washer 136 is centered in the spray head 104 to align with the key 128 on the back plate 126 of the engine housing 120; however, the keyed washer 136 may be positioned anywhere within the spray head 104 to align with the position of the key 128 on the back plate 126.

The positioning tabs 176 may facilitate the alignment and attachment of the engine enclosure 200 to the spray head 104. The positioning tabs 176 may be slidably inserted in between the front plate 124 and the back plate 126 of the engine housing 120. The ledges 127 on the back plate 126 facilitate the insertion process. It should be noted that the positioning tabs 176 may allow the engine enclosure 200 to rotate relative to the spray head 104, so as to allow the user to selectively change the mode of the showerhead 100.

As shown in FIG. 12, the cap cavity 188 on the back side of the spray head 104 receives the keyed washer 136. The fastener 138 may be received from the back side of the spray head 104 through the fastening aperture 139 defined within the keyed washer 136 and into the fastening cavity 129 defined within the key 128. The fastener 138 rotatably couples the keyed washer 136 to the engine enclosure 200. The keying walls 190 of the cap cavity 188, positioned on either side of the washer stop 137, may interface with the washer stop 137 on the back side of the keyed washer 136 when the keyed washer 136 is rotated, as will be discussed in more detail below.

Once the fastener is attached, the cap 140 is placed over the cap cavity 188 on the back side of the spray head 104. The cap 140 provides an aesthetically pleasing appearance to cover the cap cavity 188 and helps to seal the cavity from fluid and debris. In some embodiments, the cap 140 may be press fit, threaded, or otherwise fastened to the spray head 104.

It should be noted that the various components of the showerhead 100 described above may be attached and fastened to one another by various conventional means, such as, for example, welding (e.g. ultrasonic welding), heating, adhesive, or other techniques that secure the parts together. Once the engine enclosure 200 is secured to the spray head 104 (and regulator and filter are secured to the handle, if included), the showerhead 100 is ready to be connected to a water supply, e.g., J-pipe or other fluid source, and be used.

Operation of the Showerhead

With reference to FIGS. 3, 5B and 13-16B, fluid flow through the showerhead of FIG. 1A will be described in more detail. With reference to FIG. 3, water flows from a source into a fluid inlet channel 182 enclosed by the handle 102 and the inlet channel housing 180 via the inlet 108. From the fluid inlet channel 182, water enters a fluid inlet chamber 183. The fluid inlet chamber is defined by the sealing wall 172 and mode seal 134. Water exits the fluid inlet chamber 183 through the inlet aperture 168 defined within the mode seal 134.

With reference to FIG. 14, water flows through the inlet aperture 168 into one or more of the mode apertures 164*a,b* on the back plate 126, depending upon the alignment of the inlet aperture 168 with the mode apertures 164*a,b*. As mentioned previously, each of the mode apertures 164*a,b* may correspond to one or more modes of the showerhead. The mode apertures 164*a,b* may have bars running through their centers to help prevent the seal 134 from getting pushed or sucked through a larger opening, while still providing greater fluid flow volume. The mode seal 134 may remain stationary within the sealing wall 172, while the mode apertures 164*a,b* may be repositioned relative to the mode seal 134 by moving the mode selector 116.

The mode selector 116 acts as a handle to drive rotation of the entire engine enclosure 200 in the spray chamber housing 202. As the mode selector 116 is turned, the engine enclosure 200 rotates, which rotates the key 128 on the back plate 126. Because the key 128 is engaged with the keyed washer 136, rotation of the key 128 rotates the keyed washer 136 about the axis of the fastener 138 within the cap cavity 188. As shown in FIG. 12, the keying walls 190 of the cap cavity 188 may interface with the washer stop 137 on the back side of the keyed washer 136 to prevent a full rotation of the keyed washer 136. In the example shown in FIG. 12, the keyed washer 136 may rotate less than 90 degrees until the washer stop 137 strikes one of the keying walls 190. The shorter the keying walls 190, the more the washer 136 can rotate about the fastener 138. Limiting the rotation of the washer 136 limits the rotation of the engine enclosure 200 via the mode selector 116. Thus, the keying walls 190 and the washer stop 137 help secure the pulsed spray engine 142 in a desired location by defining the degrees of rotation available to the engine enclosure 200 and subsequently the pulsed spray engine 142 to allow a user to change the mode such as by turning the mode selector 116 to rotate the pulsed spray engine 142. It may be preferable to allow for less or greater rotation of the washer 136 within the cap cavity 188 depending upon the number of modes desired.

Moving the mode selector 116 further repositions each of the detent recess 162*a-c* relative to the plunger 130. The spring 132 allows the plunger 130 to move in and out of the detent recess 162*a-c* as the engine enclosure 200 is moved by the mode selector 116. The plunger 130 allows the engine enclosure 200 to stay in place when no force is applied to the mode selector 116.

Depending upon the rotational positioning of the engine enclosure 200, the mode seal 134 may cover a single mode aperture 164*a* or 164*b*, or it may only partially cover both 164*a* and 164*b*. When the mode seal 134 covers only mode aperture 164*b*, as shown in FIG. 14, water may flow through mode aperture 164*a* and into the inner housing enclosure 268, as shown in FIG. 13, and the inner fluid distribution chamber 194, as shown in FIG. 5B. When the mode seal 134 covers only mode aperture 164*a*, water may flow through mode aperture 164*b* and into the outer housing enclosure 270, as shown in FIG. 13, and the outer fluid distribution chamber 192, as shown in FIG. 5B. When the mode seal 134 only partially covers both mode aperture 164*b* and mode aperture 164*a*, water may flow through both mode apertures 164*a,b* and into both the inner housing enclosure 268 (and the inner distribution chamber 194) and the outer housing enclosure 270 (and the outer distribution chamber 192).

The walls 186 and 184 of the engine housing 120, and the outer membrane ring 115 and inner membrane ring 117 of the nozzle membrane 118, and the seal between the engine housing 120 and the nozzle membrane 118, prevent fluid from one flow path through one chamber 192, 194 from reaching outlets and/or nozzles in another flow path through another chamber 194, 192 when the engine enclosure 200 is assembled. The different chambers 192, 194 are associated with different nozzle arrays 112, 114*a,b* on the face plate 110 and different modes of spray. While only two mode apertures 164*a,b* and only two flow pathways are shown, many mode apertures and fluid distribution chambers are possible allowing for various modes of spray. Both the shape and locations of the mode apertures 164*a,b* and walls defining the fluid distribution chambers 192, 194 may also be varied based on the desired modes for the showerhead. Thus, repositioning the mode selector 116 relative to the spray chamber housing 202 may vary the showerhead mode.

Figure 15:
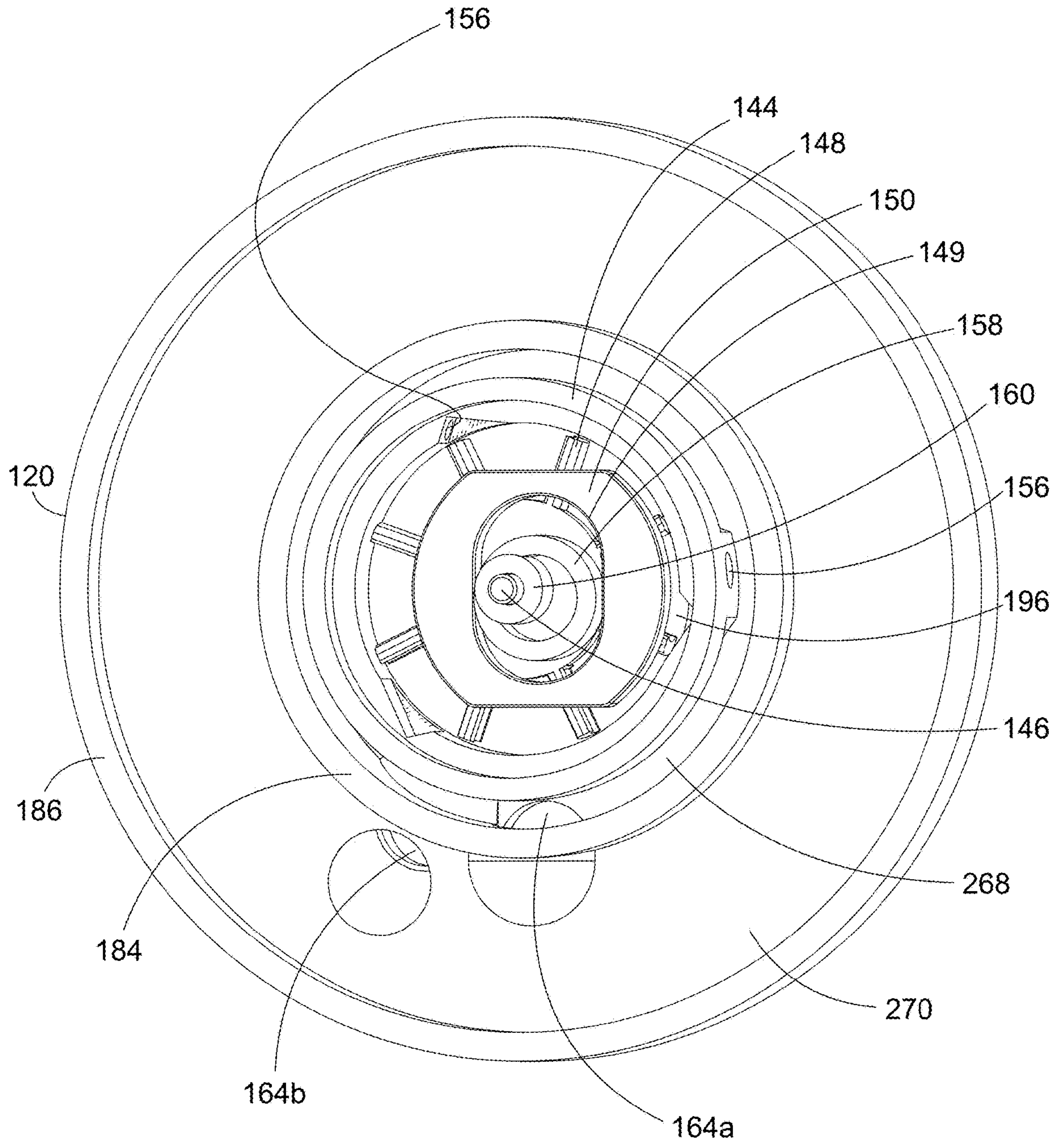
FIG. 15 is an isometric view of an engine inside an engine housing of the showerhead of FIG. 1A.

Each flow path will now be described in more detail. As shown in FIGS. 5B, 13, and 14, when the mode seal 134 covers only mode aperture 164*b*, water may flow through mode aperture 164*a* and into the inner fluid distribution chamber 194, where the pulsed spray engine 142 is housed. When water flows into the inner fluid distribution chamber 194, it may flow into the pulsed spray engine 142 through the flow directing apertures 156 positioned around the flow directing housing 144, as shown in FIG. 15. If the flow directing housing 144 includes a rear extension 276, creating a space between the housing 144 and the inner housing enclosure 268, then fluid may flow around the flow directing housing 144 and access all flow directing apertures 156 more effectively.

Figure 16A:
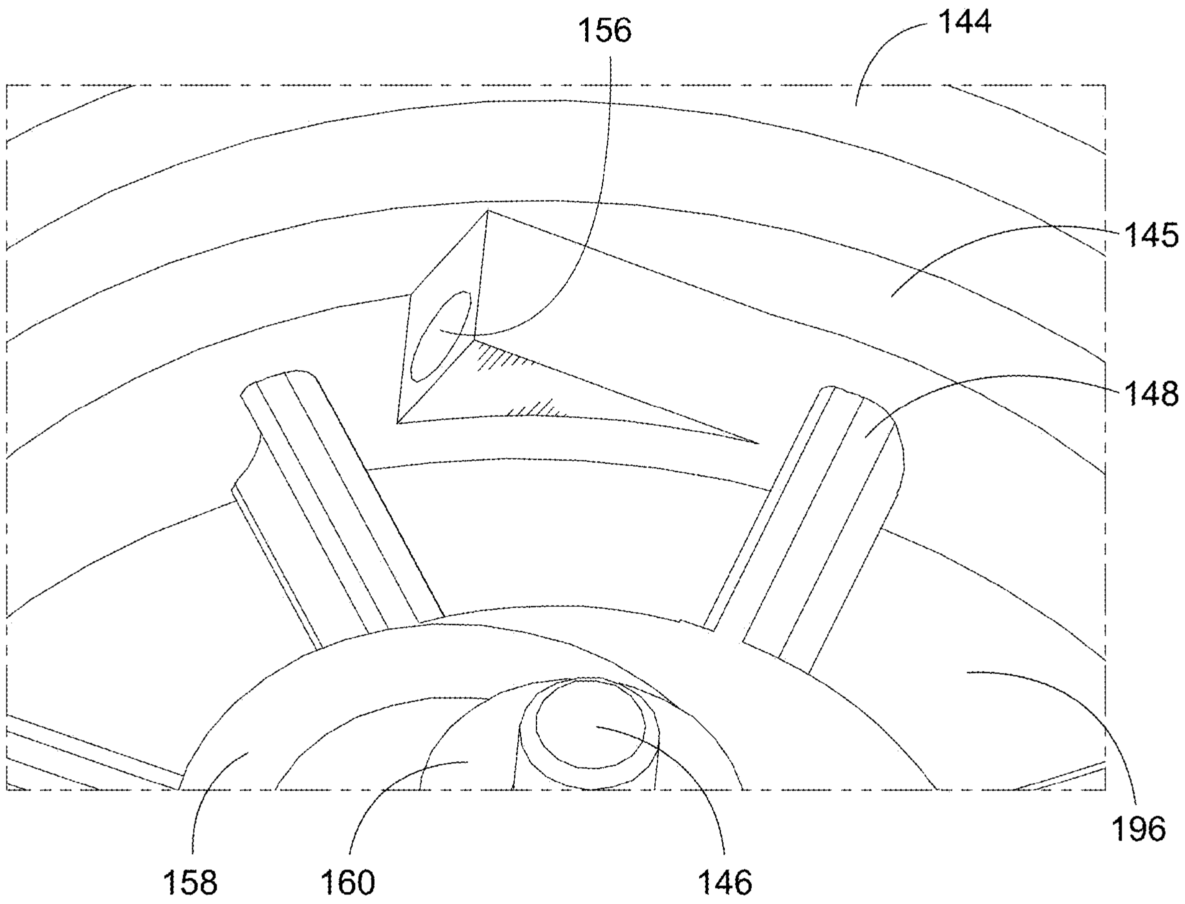
FIG. 16A is an isolated isometric view of a portion of a flow directing aperture and a portion of a turbine inside the engine of FIG. 8.
Figure 16B:
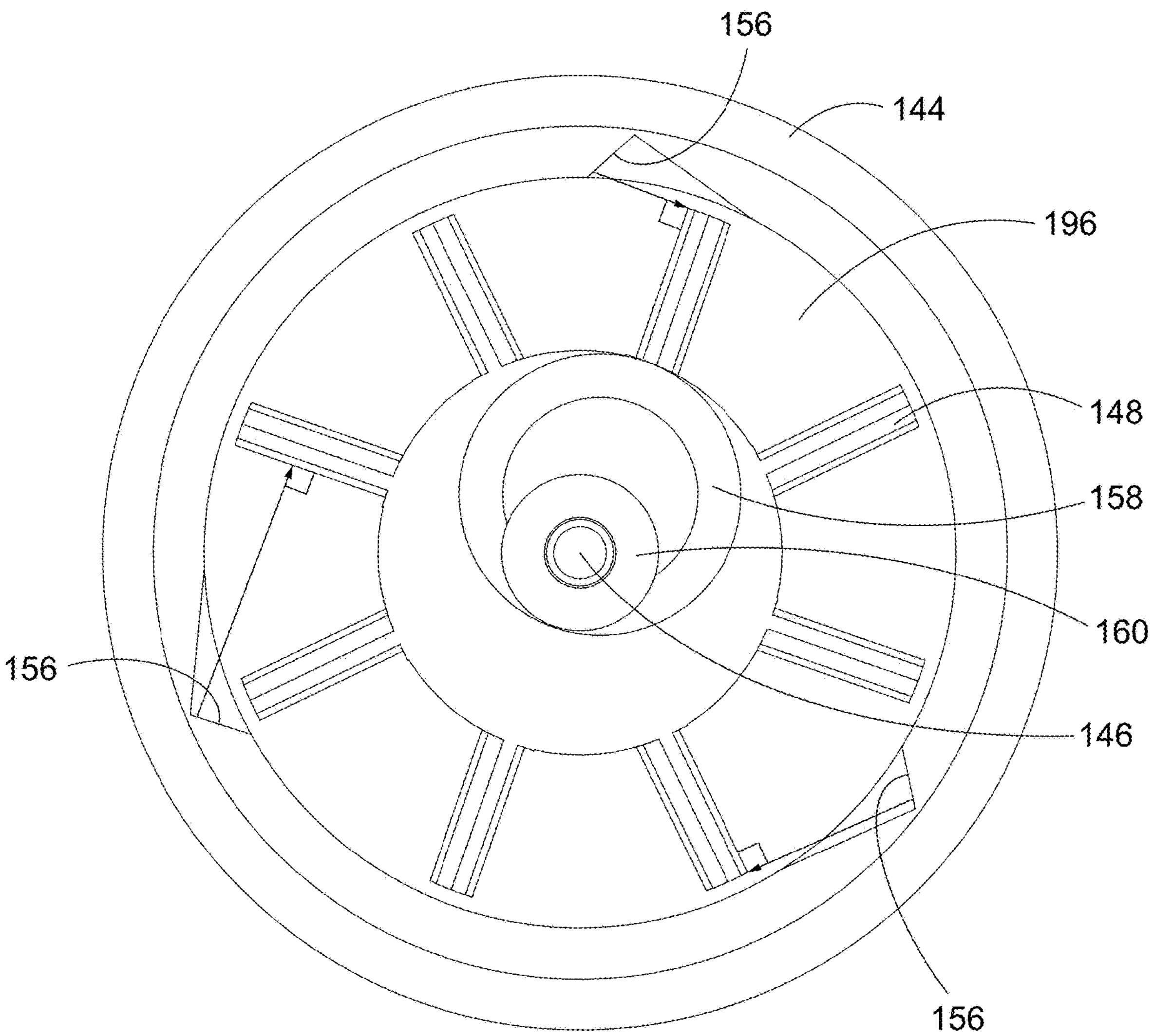
FIG. 16B is a front elevation view of the engine of FIG. 8 showing a flow path of water inside the engine.

With reference to FIG. 16A, water flowing through the flow directing apertures 156 enters a turbine chamber 196 containing the turbine 148. With reference to FIG. 16B, water may strike the blades 153 of the turbine 148 at an angle, for example, an angle of about 90 degrees, due to the tangential positioning of the flow directing apertures 156 about the flow directing housing 144. The flow directing apertures 156 may be arranged around the periphery of the flow directing housing 144 such that at least one flow directing aperture 156 is in fluid communication with at least one blade 153. As shown in FIG. 16B, the three flow directing apertures 156 are in fluid communication with at least three blades 153. In this example, the water flowing through the flow directing apertures 156 strikes the blades at substantially a right angle, providing greater torque to the turbine 148 than that provided through traditional "end feeding" systems. The point of contact between the water stream and the blade 153 may begin at the outer end portion 290 of the blade 153, may move towards the inner end portion 292 and central hub 161 to a point, and then transition back towards the outer end portion 290 as the blade 153 moves further away from the flow directing aperture 156. In other words, the area of water contact may travel back and forth along the length of the blades 153.

As the water comes into contact with the blades 153, it causes the turbine 148 to rotate about the pin 146. With reference to FIGS. 6 and 8, rotation of the turbine 148 may rotate the cam follower 160. As the cam follower 160 rotates, it may move along the interior surface 159 of the aperture defined by the cam 158. This motion may in turn cause the cam 158 to rotate. As the cam 158 rotates, the cam 158 abuts against the interior side wall 155 of the cam aperture 149 of the shutter 150, and moves the shutter 150.

Due to the eccentricity of the cam 158, the shutter 150 moves around a center axis of the turbine 148. However, the movement of the shutter 150 is constrained by the constraining walls 264 of the shutter recess 121 as they engage the constraining edges 254 of the shutter 150. As such, as the cam 158 rotates, the shutter 150 is moved substantially linearly across the shutter recess 121 in a reciprocating pattern. In particular, the constraining walls 264 restrict the motion of the shutter 150 to a substantially linear pathway. The solid sides of the shutter 150 allow the shutter 150 to selectively block fluid flow to apertures when positioned above those apertures. The movement of the shutter 150 back and forth causes the shutter 150 to cover and expose different apertures 154*a,b* on the shutter recess 121 which correspond to different nozzle arrays 114*a,b* on the face plate 110, providing a pulsating mode of water spray. Thus, when mode aperture 164*b* is covered by mode seal 134, water flows through the pulsed spray engine 142 and is dispensed out the face plate 110 through nozzles 114*a,b* in a pulsating mode.

When mode aperture 164*a* is covered by mode seal 134, water does not flow through the engine and the pulsating mode is shut off. In this case, as shown in FIGS. 5B and 13, water may flow through mode aperture 164*b*, into the outer fluid distribution chamber 192, and dispense out nozzle array 112 as a streaming mode. When both mode apertures 164*a,b* are only partially covered by mode seal 134, water may flow through both mode apertures 164*a,b*, pass through both fluid distribution chambers 192, 194 in the manner described above, and exit the showerhead 100 through both nozzle arrays 112 and 114*a,b* in both a pulsating mode and a streaming mode.

It should be noted that although the various examples discussed herein have been discussed with respect to showerheads, the devices and techniques may be applied in a variety of applications, such as, but not limited to, sink faucets, kitchen and bath accessories, lavages for debridement of wounds, pressure washers that rely on pulsation for cleaning, car washes, lawn sprinklers, and/or toys.

All directional references (e.g., upper, lower, upward, downward, left, right, leftward, rightward, top, bottom, above, below, vertical, horizontal, clockwise, and counterclockwise) are only used for identification purposes to aid the reader's understanding of the examples of the invention, and do not create limitations, particularly as to the position, orientation, or use of the invention unless specifically set forth in the claims. Joinder references (e.g., attached, coupled, connected, joined and the like) are to be construed broadly and may include intermediate members between the connection of elements and relative movement between elements. As such, joinder references do not necessarily infer that two elements are directly connected and in fixed relation to each other.

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A showerhead comprising:

a housing defining a chamber in fluid communication with a fluid inlet, a first bank of nozzles, and a second bank of nozzles; and a pulsed spray engine at least partially received within the chamber, the pulsed spray engine comprising:

a flow directing housing, wherein the flow directing housing comprises a plurality of flow directing apertures, with inlets defined in a curved surface and outlets formed in flat faces, positioned around a perimeter of the flow directing housing, wherein the plurality of flow directing apertures are in fluid communication with the fluid inlet;

a turbine positioned within the flow directing housing, wherein the turbine comprises a plurality of blades;

a cam coupled to the turbine; and a shutter coupled to the cam;

wherein as the turbine rotates, the cam causes the shutter to alternatingly connect and disconnect the first bank of nozzles and the second bank of nozzles from the fluid inlet.

2. The showerhead of claim 1, wherein a flow of a fluid through the plurality of flow directing apertures causes the turbine to rotate.

3. The showerhead of claim 2, wherein the fluid contacts each of the plurality of blades at substantially a 90 degree angle.

4. The showerhead of claim 1, wherein:

the first bank of nozzles comprises a plurality of first outlets;

the second bank of nozzles comprises a plurality of second outlets;

the first outlets are fluidly connected to the fluid inlet substantially simultaneously and are fluidly disconnected from the fluid inlet substantially simultaneously; and the second outlets are fluidly connected to the fluid inlet substantially simultaneously and are fluidly disconnected from the fluid inlet substantially simultaneously.

5. The showerhead of claim 1, wherein the showerhead further comprises:

an engine housing, wherein the pulsed spray engine is at least partially received within the engine housing and the engine housing comprises a plurality of mode apertures in fluid communication with the fluid inlet;

a mode seal, wherein the mode seal connects or disconnects each of the plurality of mode apertures from the fluid inlet depending upon a position of the engine housing relative to the mode seal.

6. The showerhead of claim 5, wherein at least one of the plurality of mode apertures is in fluid communication with the chamber.

7. The showerhead of claim 6, wherein when the at least one mode aperture is connected to the fluid inlet, fluid is dispensed out the first bank of nozzles and the second bank of nozzles in a pulsating mode.

8. A method of producing a pulsating spray mode for a showerhead comprising:

fluidly connecting a pulsed spray engine to a fluid source, wherein the pulsed spray engine comprises a housing with a plurality of apertures having inlets defined in a curved surface and outlets formed in flat faces, wherein the plurality of apertures provide tangential streams of fluid into the housing;

fluidly connecting a first plurality of nozzles to the fluid source, wherein the pulsed spray engine opens each of the nozzles within the first plurality of nozzles substantially simultaneously; and fluidly disconnecting the first plurality of nozzles from the fluid source, wherein the pulsed spray engine closes each of the nozzles within the first plurality of nozzles substantially simultaneously.

9. The method of claim 8 further comprising powering the pulsed spray engine to open and close each of the nozzles with fluid from the fluid source, wherein the fluid enters the pulsed spray engine tangentially through the housing and rotates a turbine positioned within the housing.

10. The method of claim 9, wherein the fluid contacts the turbine at a 90 degree angle.

11. The method of claim 9, wherein powering the engine comprises turning the pulsed spray engine to a certain degree to activate the pulsating spray mode.

12. A showerhead engine comprising:

a housing with a tangential fluid feed, wherein the tangential fluid feed comprises a plurality of fluid directing apertures, with inlets defined in a curved surface and outlets formed in flat faces, positioned around a perimeter of the housing;

a turbine positioned within the housing;

a shutter operatively coupled to the turbine; and a cam positioned within an aperture of the shutter and eccentrically oriented relative to a center of the turbine.

13. The showerhead engine of claim 12, wherein a fluid enters the housing through the tangential fluid feed and contacts the turbine at substantially a right angle.

14. The showerhead engine of claim 12, wherein the shutter comprises two curved edges and two constraining edges, wherein the constraining edges constrain the shutter to a lateral movement.

15. The showerhead engine of claim 14, wherein a fluid entering the housing through the tangential fluid feed rotates the turbine and a rotation of the turbine causes the shutter to move in a reciprocal motion until the turbine ceases rotation.

16. The showerhead engine of claim 15, wherein the reciprocal motion allows a first group of nozzles to be covered by the shutter while a second group of nozzles is uncovered, and, as the shutter reciprocates, the shutter moves to close the second group of nozzles at the same time that the first group of nozzles is opened.

17. The showerhead of claim 16, wherein the inlets are defined in a side surface of the housing.

18. The showerhead of claim 12, wherein the inlets are defined in an outer surface of the housing.

19. The showerhead of claim 18, wherein the plurality of fluid directing apertures comprise outlets defined in flat inner faces of the housing.

* * * * *